United States Patent
Murase et al.

(10) Patent No.: US 9,941,537 B2
(45) Date of Patent: Apr. 10, 2018

(54) FUEL CELL MODULE AND FUEL CELL DEVICE

(71) Applicant: KYOCERA Corporation, Kyoto-shi, Kyoto (JP)

(72) Inventors: Koji Murase, Amagasaki (JP); Tomoyuki Oda, Sagara-gun (JP); Masanori Suehiro, Kusatsu (JP)

(73) Assignee: KYOCERA Corporation, Kyoto (JP)

( * ) Notice: Subject to any disclaimer, the term of this patent is extended or adjusted under 35 U.S.C. 154(b) by 167 days.

(21) Appl. No.: 14/892,362

(22) PCT Filed: May 23, 2014

(86) PCT No.: PCT/JP2014/063718
§ 371 (c)(1),
(2) Date: Nov. 19, 2015

(87) PCT Pub. No.: WO2014/189135
PCT Pub. Date: Nov. 27, 2014

(65) Prior Publication Data
US 2016/0087296 A1    Mar. 24, 2016

(30) Foreign Application Priority Data

May 23, 2013 (JP) .................. 2013-109110
Nov. 29, 2013 (JP) .................. 2013-247845
Nov. 29, 2013 (JP) .................. 2013-247850

(51) Int. Cl.
*H01M 8/24* (2016.01)
*H01M 8/249* (2016.01)
(Continued)

(52) U.S. Cl.
CPC ....... *H01M 8/0618* (2013.01); *H01M 8/0625* (2013.01); *H01M 8/24* (2013.01); *H01M 8/249* (2013.01); *H01M 8/2475* (2013.01); *H01M 2008/1293* (2013.01)

(58) Field of Classification Search
None
See application file for complete search history.

(56) References Cited

U.S. PATENT DOCUMENTS 6,458,477 B1    10/2002  Hsu
2008/0038622 A1  2/2008  Valensa et al.
(Continued)

FOREIGN PATENT DOCUMENTS

CN    1339181 A    3/2002
CN    103081198 A    5/2013
(Continued)

OTHER PUBLICATIONS

International Search Report (Form PCT/ISA/210) dated Jul. 15, 2014 and issued for International Patent Application No. PCT/JP2014/063718.

(Continued)

*Primary Examiner* — Yoshitoshi Takeuchi
(74) *Attorney, Agent, or Firm* — Procopio Cory Hargreaves and Savitch LLP

(57) ABSTRACT

Problem: To provide a fuel cell module and a fuel cell device with improved power output.
Resolution means: A fuel cell module (27) according to the present invention includes: a housing (2); a plurality of cell stack devices (1) arranged inside the housing (2), each cell stack device (1) including a cell stack (3) in which a plurality of fuel cells (2) that generate power using fuel gas and oxygen-containing gas are arranged; and exhaust gas discharge paths (39, 40) formed between the cell stack devices (1) for discharging the exhaust gas from the fuel cells. Consequently, the exhaust gases can be efficiently discharged, thereby improving the power output. A fuel cell device (52) can have improved power output by being provided with the above-described fuel cell module (27).

18 Claims, 20 Drawing Sheets

(51) Int. Cl.
| | |
|---|---|
| *H01M 8/06* | (2016.01) |
| *H01M 8/0606* | (2016.01) |
| *H01M 8/0612* | (2016.01) |
| *H01M 8/0637* | (2016.01) |
| *H01M 8/2475* | (2016.01) |
| *H01M 8/124* | (2016.01) |

(56) References Cited

U.S. PATENT DOCUMENTS

| | | |
|---|---|---|
| 2010/0081018 A1 | 4/2010 | Sridhar et al. |
| 2016/0087296 A1* | 3/2016 | Murase ............... H01M 8/0625 429/423 |

FOREIGN PATENT DOCUMENTS

| | | |
|---|---|---|
| JP | 2006-331977 A | 12/2006 |
| JP | 2007-059105 A | 3/2007 |
| JP | 2011-049021 A | 3/2011 |
| WO | 00/26983 A1 | 5/2000 |
| WO | 2011/073801 A1 | 6/2011 |

OTHER PUBLICATIONS

Office Action dated Nov. 4, 2016 issued by the Chinese Patent Office in Counterpart Chinese Application No. 201480025069.8, 8 pages.
Extended European Search Report dated Oct. 11, 2016 issued by the European Patent Office in counterpart European Patent Application No. 14 80 0526.7, 8 pages.

* cited by examiner

FUEL CELL MODULE AND FUEL CELL DEVICE

TECHNICAL FIELD

The present invention relates to a fuel cell module and a fuel cell device.

BACKGROUND

In recent years, various types of fuel cells in which electrical power can be obtained using fuel gas (hydrogen-containing gas) and oxygen-containing gas (air) have been proposed as next-generation energy sources. Furthermore, various types of fuel cell modules in which a plurality of fuel cells are connected to form a cell stack device which is then housed in a housing as well as various types of fuel cell devices in which such a fuel cell module is housed in an outer casing have also been proposed.

For example, a fuel cell module including four cell stack devices housed within a housing has been proposed as a conventional fuel cell module (see Patent Document 1).

PRIOR ART DOCUMENT

Patent Document

Patent Document 1: Japanese Unexamined Patent Application Publication No. 2006-331977A

SUMMARY OF THE INVENTION

Problems to be Solved by the Invention

However, in the fuel cell module disclosed in Patent Document 1, exhaust gas discharge paths for allowing exhaust gas not used for power generation in the fuel cells to escape are only provided on both ends of the fuel cell module in the direction in which the cell stack devices are arranged. Therefore, particularly in a fuel cell device in which a plurality of cell stack devices are housed within a housing, it is difficult to efficiently discharge the exhaust gas not used for power generation in the fuel cells. As a result, the power output decreases, or the power output cannot be improved.

Therefore, an object of the present invention is to provide a fuel cell module and a fuel cell device in which exhaust gas not used for power generation in the fuel cells can be efficiently discharged and in which the power output can be improved.

Means to Solve the Problem

A fuel cell module according to the present invention includes: a housing; a plurality of cell stack devices arranged inside the housing, each cell stack device including a cell stack in which a plurality of fuel cells that generate power using fuel gas and oxygen-containing gas are arranged; and exhaust gas discharge members formed between the cell stack devices for discharging exhaust gas from the fuel cells.

Furthermore, a fuel cell device according to the present invention includes: the abovementioned fuel cell module; an auxiliary device for operating the fuel cell module; and an outer casing that houses the fuel cell module and the auxiliary device.

Effect of the Invention

In the fuel cell module of the present invention, a plurality of cell stack devices are arranged within a housing. Exhaust gas discharge members for discharging exhaust gas from the fuel cells are provided between the cell stack devices, thereby making it possible to efficiently discharge the exhaust gas as well as to improve power output.

Furthermore, a fuel cell device of the present invention includes the abovementioned fuel cell module and an auxiliary device for operating the fuel cell module, thereby making it possible to provide a fuel cell device with improved power output.

BRIEF DESCRIPTION OF THE DRAWING(S)

FIG. 1 is an exterior perspective view illustrating an example of a cell stack device for a fuel cell module according to a present embodiment.

FIGS. 2A, 2B, and 2C illustrate partial views of the cell stack device illustrated in FIG. 1. FIG. 2A is a plan view. FIG. 2B is an enlarged plan view of the portion circled by the dashed line in FIG. 2A. FIG. 2C is a cross-sectional view taken along line B-B in FIG. 2A.

FIG. 10A is a perspective view, and FIG. 10B is a plan view.

FIG. 12A illustrates a horizontal cross section, and FIG. 12B illustrates a vertical cross section.

Figure 13A:
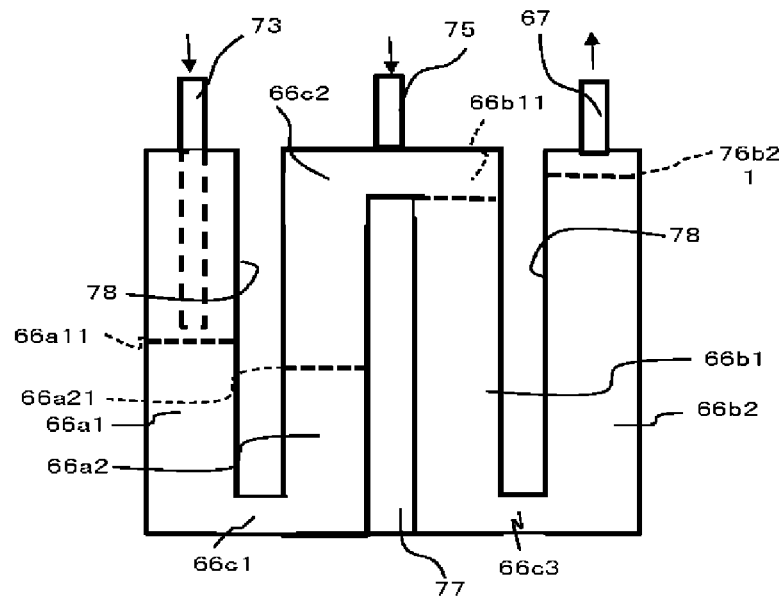
Figure 13B:
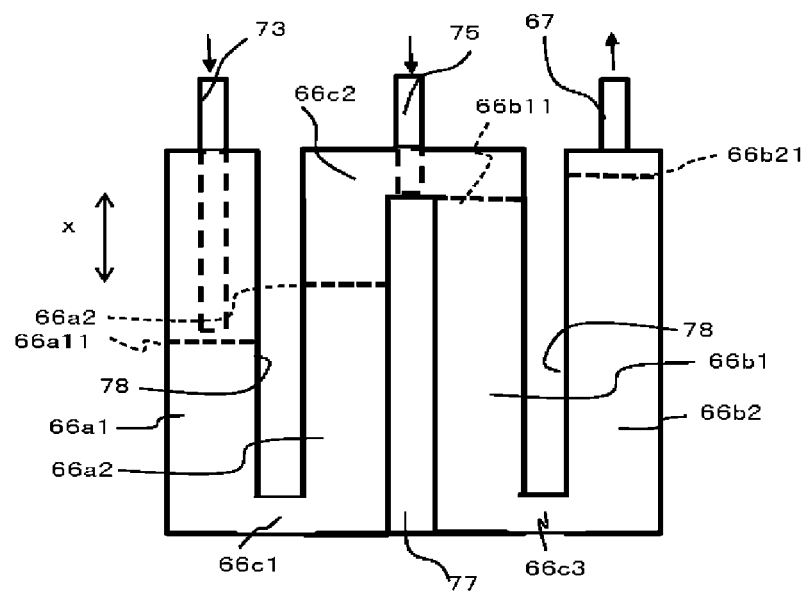

FIG. 13A is a plan view illustrating a reformer configuration in which the raw fuel gas supply pipe does not protrude into a vaporizing unit and reforming unit connecting path. FIG. 13B illustrates a reformer configuration in which a divider inside a vaporizing unit return path is positioned closer to the raw fuel gas supply pipe than is the center portion in the direction in which the fuel cells of the cell stacks are arranged.

Figure 14:
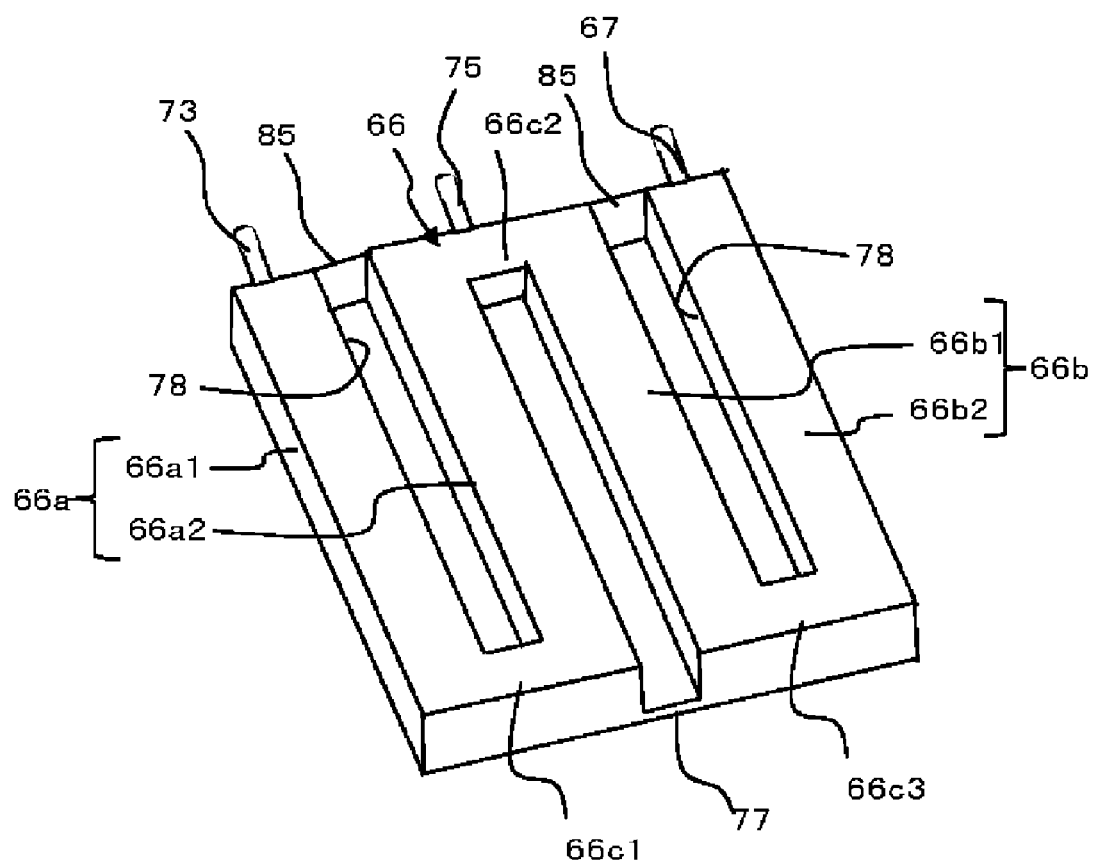

FIG. 14 is a perspective view illustrating a reformer configuration in which adjacent end faces of a vaporizing unit forward path and the vaporizing unit return path as well as adjacent end faces of a reforming unit forward path and a reforming unit return path are connected with each other by reinforcing plates.

Figure 15:
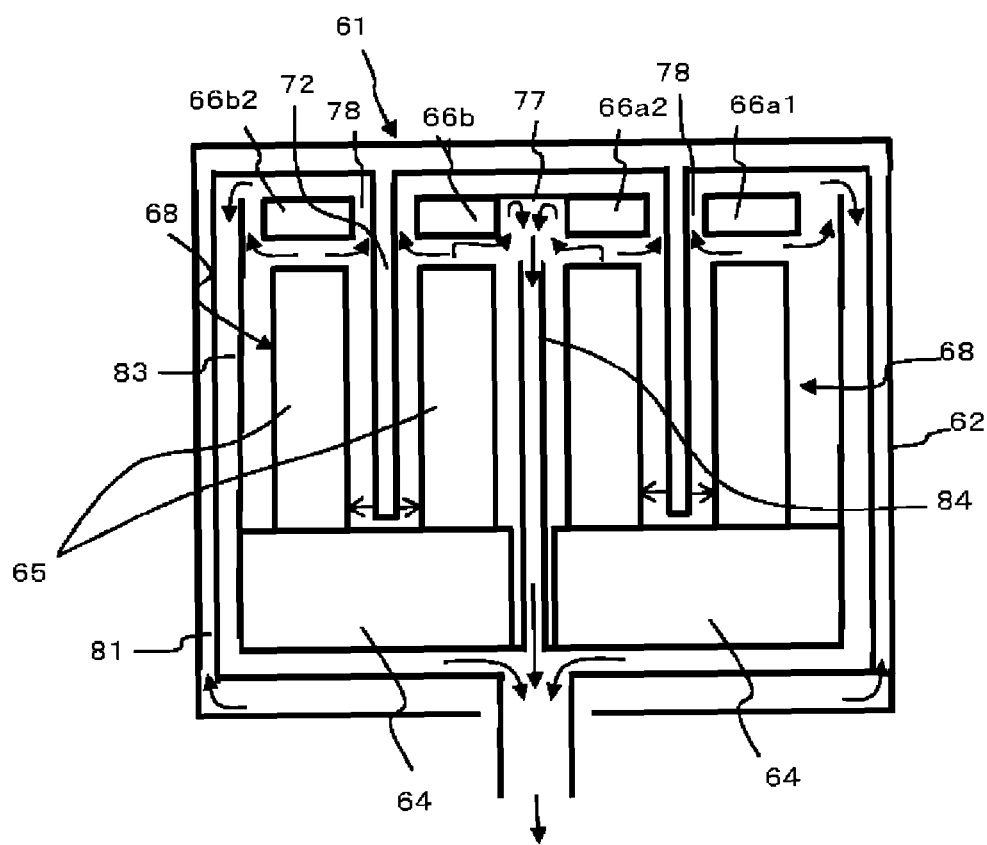

FIG. 15 is a vertical cross-sectional view illustrating a fuel cell module in which the top of the space between the vaporizing unit return path and the reforming unit forward path is blocked by a connecting plate, and a low exhaust gas discharge path is formed beneath this connecting plate.

Figure 16:
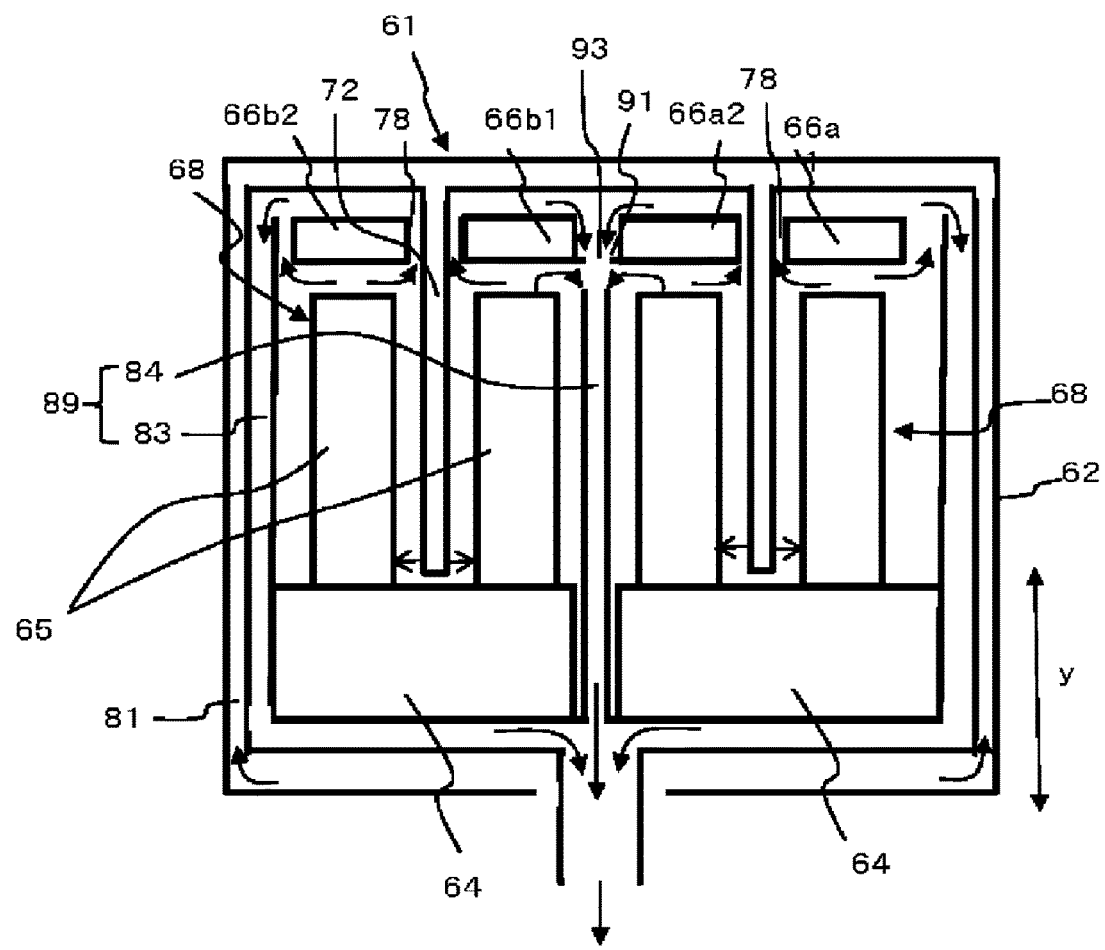

FIG. 16 is a vertical cross-sectional view illustrating a fuel cell module in which an exhaust gas hole is formed in a connecting plate extending between the vaporizing unit return path and the reforming unit forward path, and a low exhaust gas discharge path is formed beneath this exhaust gas hole.

Figure 17:
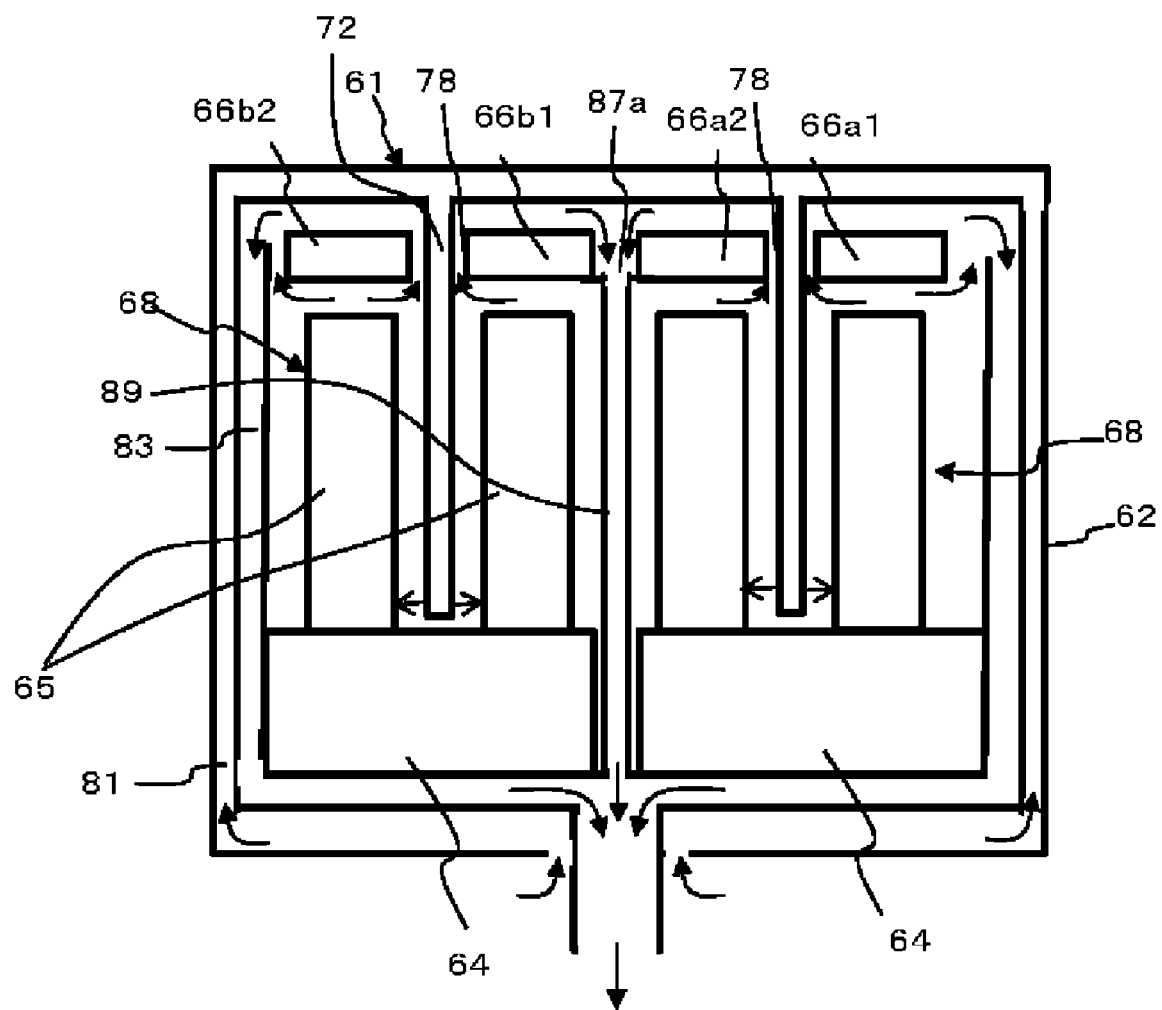

FIG. 17 is a vertical cross-sectional view illustrating another example of a fuel cell module.

Figure 18A:
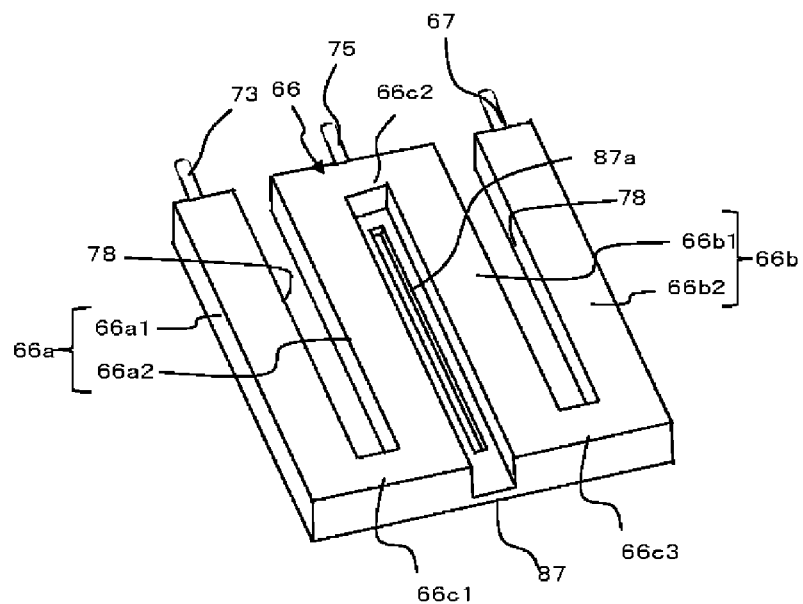
Figure 18B:
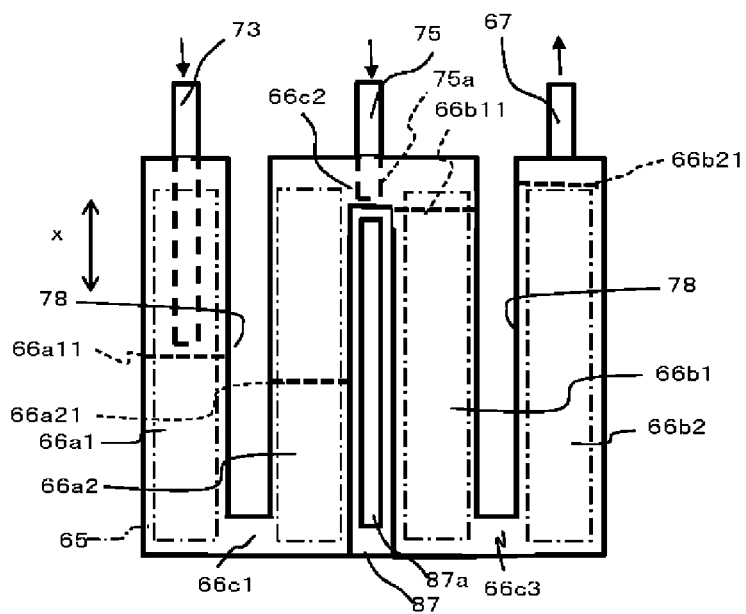

FIGS. 18A and 18B illustrate the reformer illustrated in FIG. 17. FIG. 18A is a perspective view, and FIG. 18B is a plan view.

Figure 19:
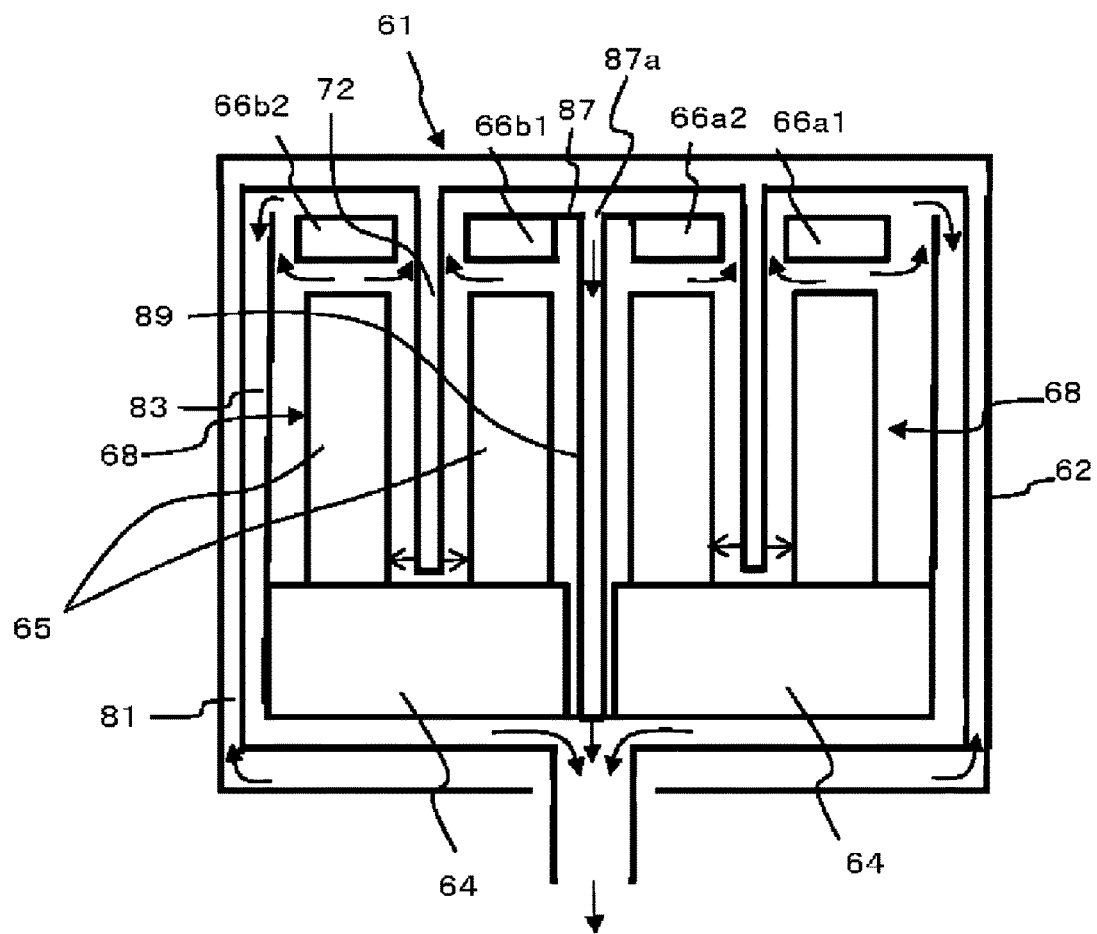

FIG. 19 is a vertical cross-sectional view illustrating a fuel cell module in which the top of the space between the vaporizing unit return path and the reforming unit forward path is blocked by a connecting plate, and an exhaust gas discharge path is connected to an exhaust gas hole formed in this connecting plate.

Figure 20:
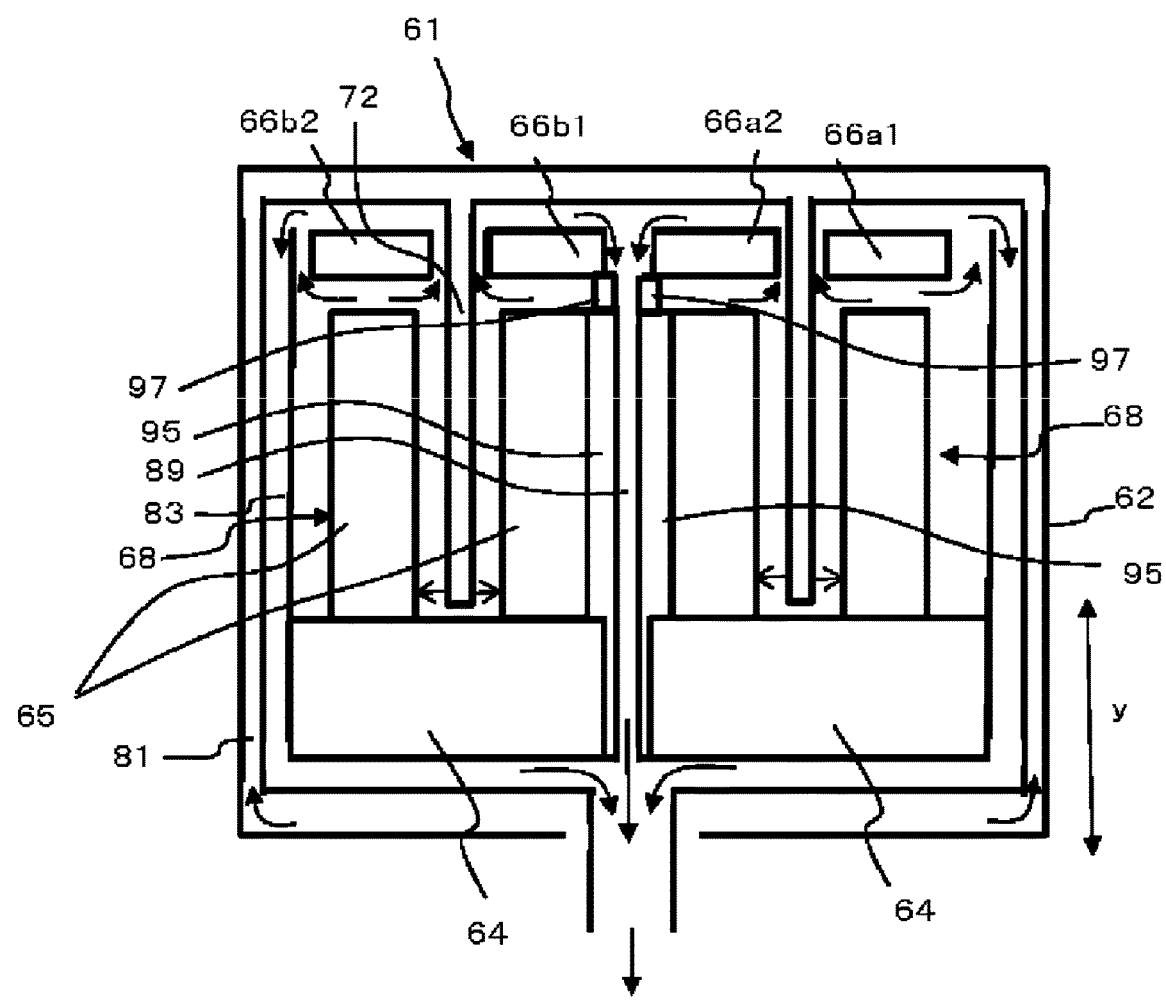

FIG. 20 is a vertical cross-sectional view illustrating a fuel cell module in which thermal insulating members are formed on both sides of the exhaust gas discharge path, and blocking members are formed such that exhaust gas does not pass through the space between the tops of the insulating members and the reformer.

DETAILED DESCRIPTION OF EMBODIMENTS

Figure 1:
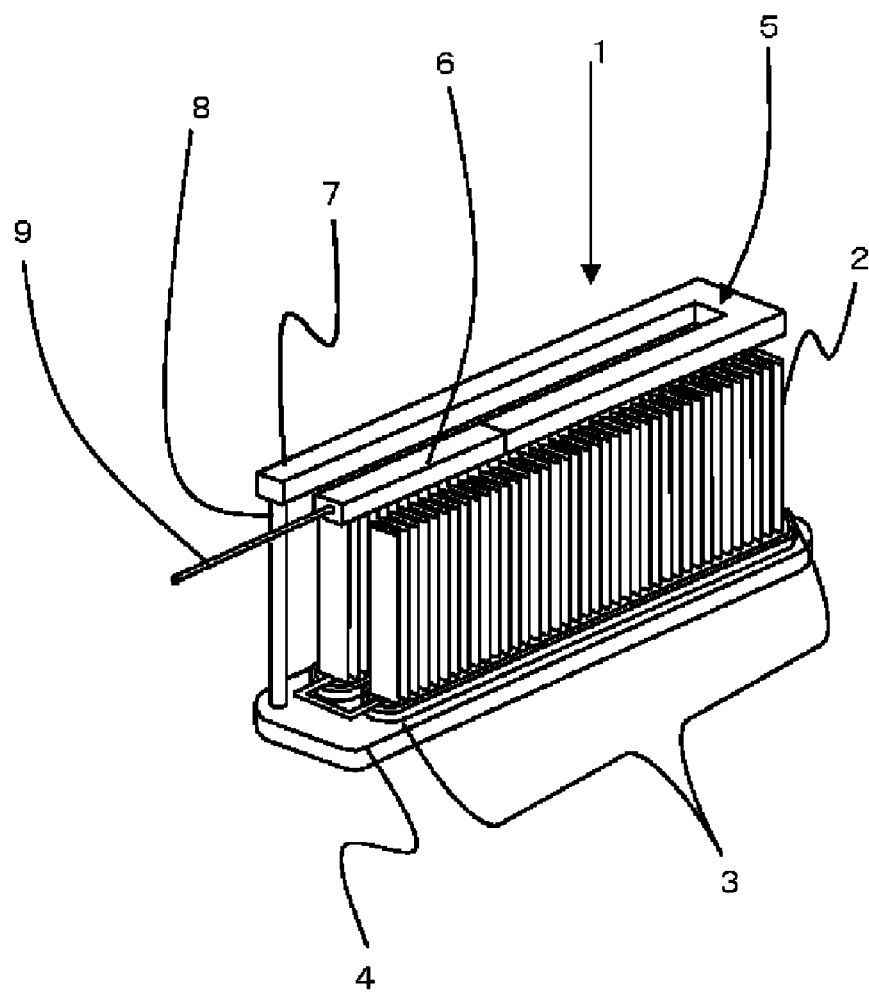
Figure 2A:
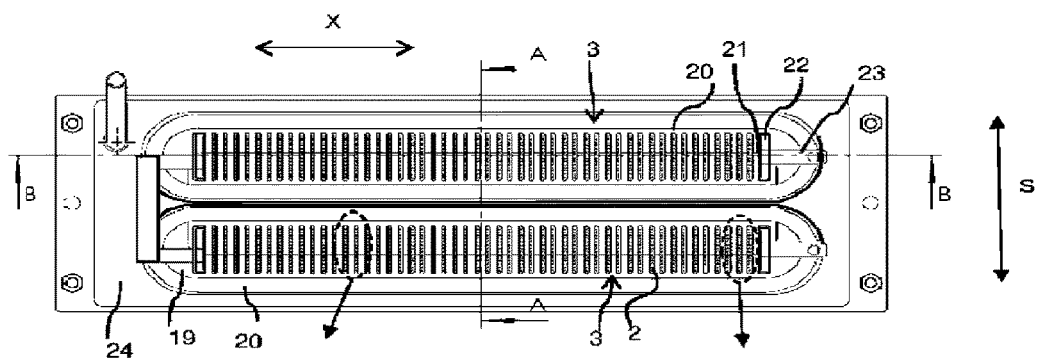
Figure 2B:
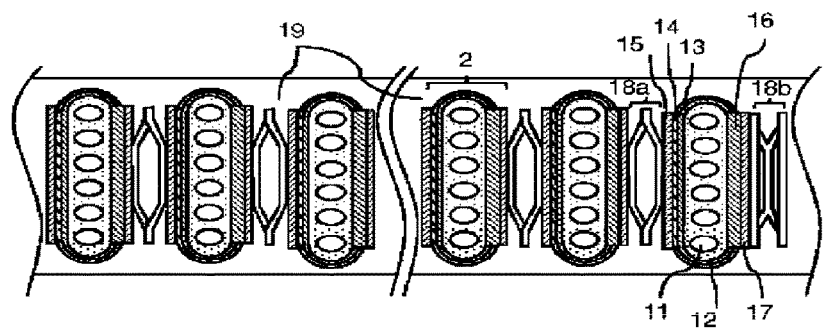
Figure 2C:
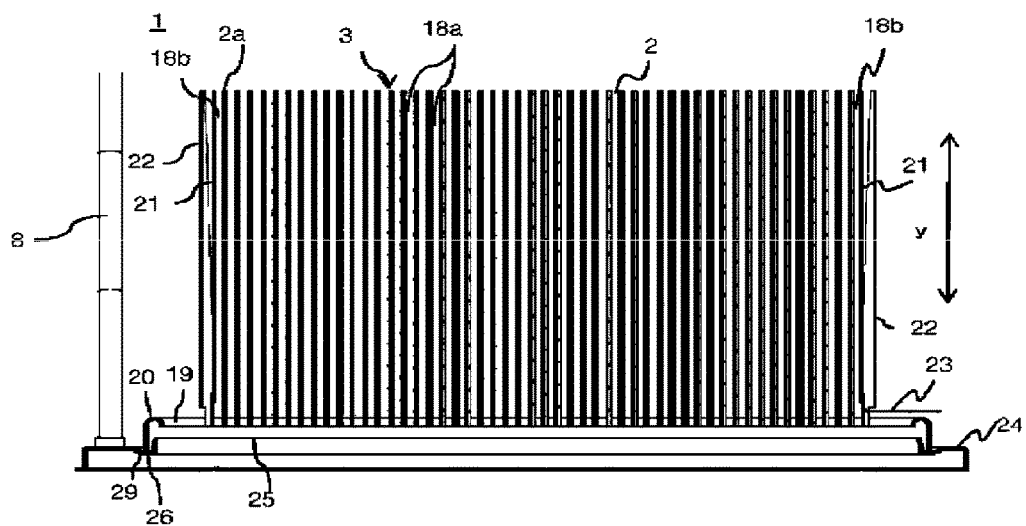

FIG. 1 is an exterior perspective view illustrating an example of a cell stack device for a fuel cell module (hereinafter, sometimes referred to as a "module") according to the present embodiment. FIGS. 2A and 2B illustrate partial views of the cell stack device illustrated in FIG. 1. FIG. 2A is a plan view, FIG. 2B is an enlarged cross-sectional view of the portion circled by the dashed line in FIG. 2A. FIG. 2C is a cross-sectional view taken along line B-B in FIG. 2A. Note that in the subsequent figures, the same reference numerals are used for the same components.

The cell stack device 1 illustrated in FIGS. 1, 2A and 2B includes two cell stacks 3. Each cell stack 3 includes a plurality of fuel cells 2 erectly arranged in a row. Adjacent fuel cells 2 are electrically connected in series via a current collector 18. Each fuel cell 2 includes gas paths 11 that allow fuel gas to flow through the fuel cell 2 from one end to the other end. The bottom end of each fuel cell 2 is fixed to a manifold 4 using an insulating bonding material 19 such as a glass sealing material to form the cell stack device 1. A reformer 5 that generates fuel gas to be supplied to the fuel cells 2 is arranged above the cell stacks 3.

The examples of fuel cells 2 illustrated in FIGS. 1, 2A and 2B are hollow flat plate-shaped fuel cells that each include a plurality of gas paths 11 that allow fuel gas to flow through the fuel cells in the lengthwise direction thereof. The fuel cells 2 are solid oxide fuel cells that each include a conductive supporting substrate 12 and a fuel electrode layer 13, a solid electrolyte layer 14, and an oxygen electrode layer 15 stacked in that order on the surface of the supporting substrate 12 that includes the gas paths 11. Oxygen-containing gas (air) flows between the fuel cells 2. The configuration of the fuel cells 2 will be described below.

Note that in the fuel cell module according to the present embodiment, the fuel cells 2 may be plate-shaped or cylinder-shaped, for example, and the shape of the cell stack device 1 may be modified as appropriate.

Moreover, end current collectors 18b are fixed to the outermost fuel cells 2 in each cell stack 3. A cell stack supporting member 21 (hereinafter, sometimes referred to as "stack supporting member 21") is fixed to the outer side of each end current collector 18b and is electrically connected thereto. A protective cover 22 is provided on the outer side of each stack supporting member 21. These protective covers 22 protect the stack supporting members 21 and the cell stacks 3 from contact with thermal insulating materials positioned around the cell stacks 3 and from external impacts. Furthermore, current leads 23 that protrude outward relative to the cell stacks 3 are connected to the stack supporting members 21.

Note that FIGS. 1, 2A and 2B illustrate an example in which the cell stack device 1 includes two cell stacks 3. However, the number of cell stacks may be adjusted as appropriate; for example, the cell stack device 1 may include only one cell stack 3. Moreover, the cell stack device 1 may also include the reformer 5.

Furthermore, the manifold 4 stores fuel gas to be supplied to the fuel cells 2. The manifold 4 includes a gas case 24 having an opening formed in the top surface thereof and a frame 20 into which the fuel cells 2 are fixed and that is fixed to the gas case 24.

The frame 20 encloses one end of each of the fuel cells 2 (the bottom ends in FIG. 2A), and the peripheries of the bottom ends of the fuel cells 2 are fixed using the insulating bonding material 19 with which the inside of the frame 20 is filled. In other words, each cell stack 3 houses the plurality of fuel cells 2 such that the bottom ends of the fuel cells 2 are arranged side by side within the frame 20 and is bonded to the frame 20 using the insulating bonding material 19. Note that the insulating bonding material 19 is made from a material such as glass to which a prescribed filler is added to achieve the desired coefficient of thermal expansion.

The gas case 24 of the manifold 4 includes an opening 25 formed in the top surface thereof. The end of the ring-shaped frame 20 is inserted into and fixed to a groove 26 formed surrounding the opening 25 of the gas case 24 such that the cell stack 3 fixed to the frame 20 covers the opening 25. Furthermore, the end of the frame 20 is fixed to the groove 26 of the gas case 24 using an insulating bonding material 29 with which the groove 26 is filled, thereby making all portions other than the gas paths 11 of the fuel cells 2 airtight. Note that the groove 26 is formed in a ring shape that surrounds the opening 25 of the gas case 24 (in other words, the groove 26 surrounds the frame 20).

In this configuration, the ends of the fuel cells 2 are fixed to the frame 20 using the insulating bonding material 19 as a separate step before fixing the cell stack 3 to the gas case 24. Therefore, the frame 20 can be fixed and sealed to the gas case 24 using the insulating bonding material 29 in a later step.

Moreover, the U-shaped reformer 5 illustrated in FIG. 1 takes a raw fuel such as natural gas or kerosene supplied via a raw fuel gas supply pipe 9 and reforms that raw fuel to produce fuel gas. It is preferable that the reformer 5 be capable of performing steam reforming which has an efficient reforming reaction. The reformer 5 includes a vaporizing unit 6 that vaporizes water and a reforming unit 7 that has a reforming catalyst (not illustrated) for reforming the raw fuel into fuel gas disposed therein. Furthermore, the fuel gas produced by the reformer 5 is supplied to the manifold 4 via a reformed gas leading-out pipe 8. The fuel gas is then supplied via the manifold 4 to the gas paths 11 formed inside the fuel cells 2.

In addition, the cell stack device 1 illustrated in FIGS. 1, 2A and 2B may be housed by sliding into a housing which is described below.

As illustrated in FIG. 2B, each fuel cell 2 is column-shaped (for example, hollow flat plate-shaped) and includes a column-shaped conductive supporting substrate 12 (hereinafter, sometimes abbreviated as "supporting substrate 12") that has a pair of flat surfaces facing one another and a fuel electrode layer 13, a solid electrolyte layer 14, and an oxygen electrode layer 15 stacked in that order on one of the flat surfaces. An interconnector 16 is formed on the other flat surface of the fuel cell 2, and a p-type semiconductor layer 17 is formed on the outer (upper) surface of the interconnector 16. The p-type semiconductor layer 17 connects a current collector 18a to the interconnector 16, forming an ohmic contact therebetween and thereby making it possible to reduce the voltage drop thereacross and to effectively avoid decreases in current collection performance. Note that the current collectors 18a and the end current collectors 18b are not illustrated in FIG. 2A. Furthermore, on a premise that the supporting substrate doubles as the fuel electrode layer, the fuel cell may be formed by the solid electrolyte layer and the oxygen electrode layer being stacked on the surface of the supporting substrate.

A well-known conventional material may be used for the fuel electrode layer 13. For example, the fuel electrode layer 13 is formed of $ZrO_2$ (referred to as a stabilized zirconia that also includes partially stabilized zirconia) containing a porous conductive ceramic such as a rare earth element in solid solution and Ni and/or NiO.

The solid electrolyte layer 14 must function as an electrolyte that allows electrons to move between the fuel electrode layer 13 and the oxygen electrode layer 15 and as a gas barrier that prevents fuel gas and oxygen-containing gas leaks. The solid electrolyte layer 14 is formed of $ZrO_2$ containing 3 to 15 mol % of a rare earth element in solid solution. Note that the solid electrolyte layer 14 may be formed of another material as long as that material exhibits the abovementioned properties.

The material for the oxygen electrode layer 15 is not particularly limited, and any well-known conventional material may be used. For example, the oxygen electrode layer 15 may be formed of a conductive ceramic made from a so-called $ABO_3$ perovskite oxide. The oxygen electrode layer 15 must be gas permeable, and it is preferable that the open porosity of the oxygen electrode layer 15 be greater than or equal to 20% and particularly in the range of 30% to 50%.

The supporting substrate 12 must be gas permeable to allow the fuel gas to permeate through to the fuel electrode layer 13 and must also be conductive in order to allow current collection via the interconnector 16. Therefore, a material such as a conductive ceramic or cermet may be used for the supporting substrate 12. For production of the fuel cells 2, if the supporting substrate 12 is produced by simultaneous sintering with the fuel electrode layer 13 or the solid electrolyte layer 14, it is preferable that the supporting substrate 12 be formed of an iron group metal and a prescribed rare earth oxide.

Moreover, in each of the fuel cells 2 illustrated in FIGS. 2A and 2B, the column-shaped (hollow flat plate-shaped) supporting substrate 12 has a long, thin plate shape that extends in the erecting direction and includes two flat surfaces and two semicircular surfaces. Furthermore, to ensure gas permeability, it is preferable that the supporting substrate 12 have an open porosity of greater than or equal to 30% and particularly in the range of 35% to 50%. It is also preferable that the supporting substrate 12 have a conductivity of greater than or equal to 300 S/cm and particularly greater than or equal to 440 S/cm. In addition, the supporting substrate 12 may also be cylinder-shaped as long as the overall columnar shape is retained.

Examples of the p-type semiconductor layer 17 may include a layer formed of a perovskite transition metal oxide, for example. More specifically, a material that has a higher electron conductivity than the material forming the interconnector 16 such as a p-type semiconductor ceramic formed of at least one of an $LaMnO_3$ oxide, an $LaFeO_3$ oxide, and an $LaCoO_3$ oxide having Mn, Fe, Co, or the like at the B site may be used, for example. It is generally preferable that the thickness of this p-type semiconductor layer 17 be in the range of 30 to 100 μm.

A material such as a lanthanum chromite perovskite oxide (an $LaCrO_3$ oxide) or a lanthanum strontium titanium perovskite oxide (an $LaSrTiO_3$ oxide) may be used for the interconnector 16, as described above. These materials are conductive and are neither deoxidized nor oxidized upon coming into contact with the fuel gas (a hydrogen-containing gas) and an oxygen-containing gas (for example, air). Moreover, the interconnector 16 must be dense in order to prevent leaks of the fuel gas flowing through the gas paths 11 formed in the supporting substrate 12 as well as leaks of the oxygen-containing gas flowing outside the supporting substrate 12. Thus, it is preferable that the interconnector 16 have a relative density of greater than or equal to 93% and particularly greater than or equal to 95%.

Furthermore, the current collectors 18a and the end current collectors 18b for electrically connecting the fuel cells 2 together may be formed of an elastic metal or alloy or of a metal fiber or alloy fiber felt to which the necessary surface treatments have been applied.

Figure 3:
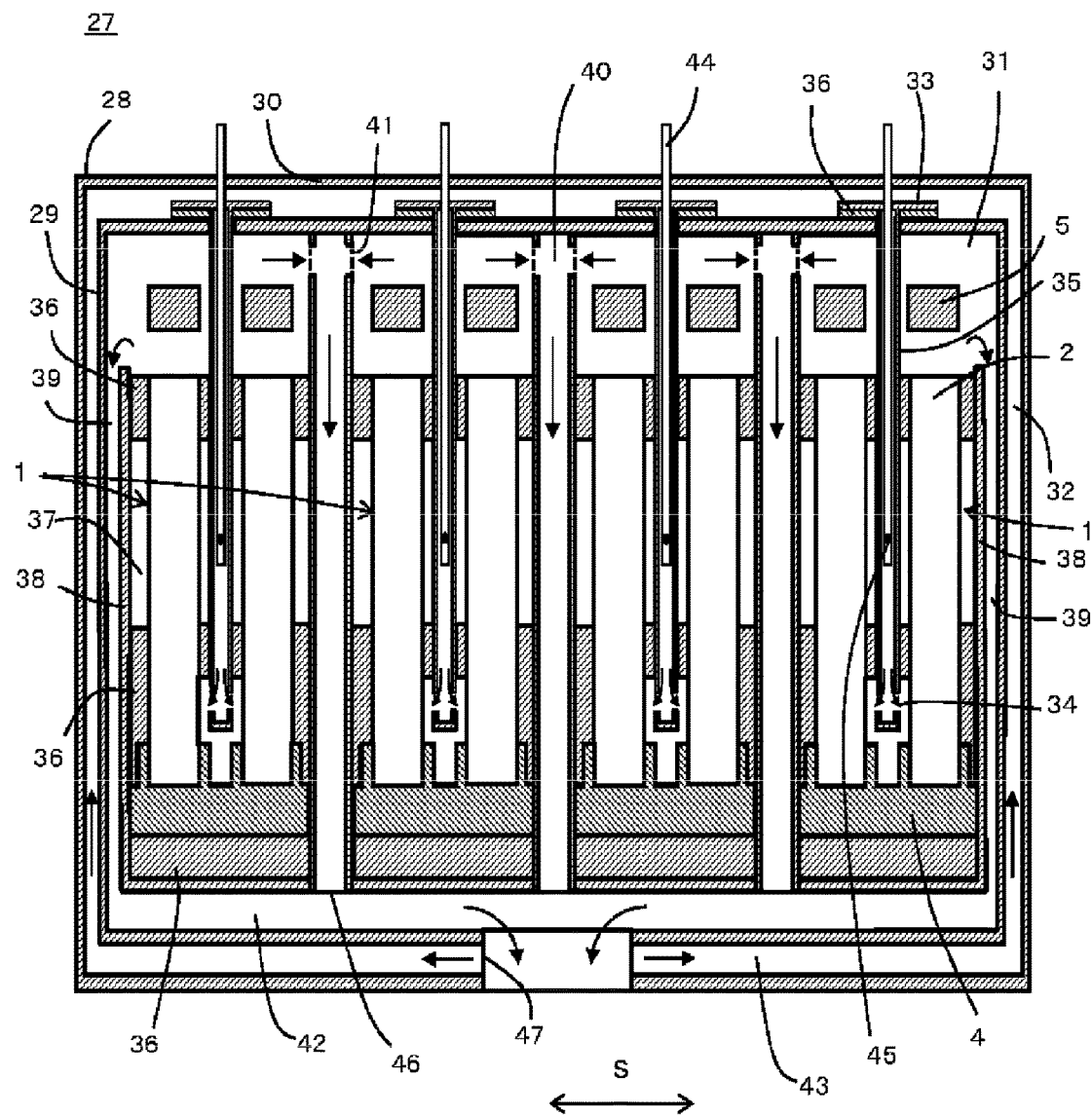
FIG. 3 is a vertical cross-sectional view illustrating an example of a fuel cell module according to the present embodiment.

FIG. 3 is a vertical cross-sectional view illustrating an example of a fuel cell module (hereinafter, sometimes referred to as "the module") according to the present embodiment. As illustrated in FIG. 3, a housing 28 of a module 27 has a two-layer structure that includes an inner wall 29 and an outer wall 30. The outer wall 30 forms the outer frame of the housing 28, and the inner wall 29 forms a power generation chamber 31 that houses the cell stack device 1. Note that in the module 27 illustrated in FIG. 3, four of the cell stack devices 1 illustrated in FIG. 1 are housed within the power generation chamber 31.

In the housing 28 illustrated in FIG. 3, the space between the inner wall 29 and the outer wall 30 forms an oxygen-containing gas leading-in path 32 through which oxygen-containing gas flows toward the fuel cells 2.

In the housing 28, hollow flat plate-shaped oxygen-containing gas leading-in members 35 going through the inner wall 29 are inserted and fixed between the cell stacks 3 arranged side by side on each manifold 4. Each oxygen-containing gas leading-in member 35 includes an oxygen-containing gas inlet (not illustrated) for allowing oxygen-containing gas to flow in and a flange 33 provided at the top end thereof. In addition, the oxygen-containing gas leading-in member 35 includes an oxygen-containing gas outlet 34 for leading in the oxygen-containing gas to the bottom ends of the fuel cells 2 provided at the bottom end thereof. This allows the oxygen-containing gas to flow along the fuel cells 2 from the bottom ends to the top ends thereof. Moreover, a thermal insulating member 36 is arranged between each flange 33 and the inner wall 29.

Note that in FIG. 3 the oxygen-containing gas leading-in members 35 are each arranged so as to be positioned between a pair of cell stacks 3. However, the oxygen-containing gas leading-in members 35 may be arranged as appropriate according to the number of cell stack devices 1 housed within the housing 28 or according to the number of cell stacks 3 in each cell stack device 1.

Moreover, thermal insulating members 36 may also be formed inside the power generation chamber 31 as appropriate in order to maintain a high temperature inside the module 27, which prevents a decrease in the temperature of the fuel cells 2 (cell stacks 3) and a decrease in power output that result from excessive radiation of heat from the inside of the module 27.

It is preferable that the insulating members 36 be arranged in the vicinity of the cell stacks 3. It is particularly preferable that the insulating members 36 be arranged on the side surfaces of the cell stacks 3 extending in the direction x in which the fuel cells 2 are arranged and that the insulating members 36 have a width greater than or equal to the width of the side surfaces of the cell stacks 3 in the direction x in which the fuel cells 2 are arranged. It is preferable that the thermal insulating members 36 be arranged on both side surfaces of the cell stacks 3.

This makes it possible to effectively inhibit temperature decreases in the cell stacks 3. Furthermore, this makes it possible to inhibit oxygen-containing gas led in by the oxygen-containing gas leading-in members 35 from being discharged from the side surface sides of the cell stacks 3, thereby making it possible to promote the flow of oxygen-containing gas between the fuel cells 2 of the cell stacks 3. As illustrated in FIG. 3, openings 37 are formed in the thermal insulating members 36 arranged on both side surface sides of the cell stacks 3 in order to adjust the flow of oxygen-containing gas to the fuel cells 2 and to decrease the differences in temperature in the lengthwise direction y in which the fuel cells 2 extend as well as in the direction x in which the fuel cells 2 are arranged.

On the inner sides of the inner walls 29 extending in the direction x in which the fuel cells 2 are arranged (that is, on the inner sides of the inner walls 29 in the direction s in which the cell stack devices 1 are arranged), exhaust gas inner walls 38 are formed. The space between the inner walls 29 and the exhaust gas inner walls 38 forms exhaust gas discharge paths 39 that allow the exhaust gas inside the power generation chamber 31 to flow from top to bottom. In other words, the space between the cell stack devices 1 on either end in the direction s in which the four cell stack devices 1 are arranged and the inner walls 29 of the housing 28 form exhaust gas discharge paths 39. The exhaust gas discharge paths 39 include exhaust gas discharge members having exhaust gas inner walls 38.

However, when a plurality of cell stack devices 1 are housed within the housing 28, a distance particularly between the fuel cell 2 in the cell stack device 1 positioned close to the center of the module and the abovementioned exhaust gas discharge path 39 is increased, which may make it difficult to efficiently discharge the exhaust gas from the fuel cell 2 in the cell stack device 1 positioned close to the center of the module.

In fuel cell modules in which fuel gas not used for power generation is combusted on the top end sides of the fuel cells 2 to produce combustion heat that keeps the fuel cells 2 at a high temperature, exhaust gas stagnates on the top end sides of the fuel cells 2, thereby preventing fuel gas not used for power generation from being combusted efficiently and potentially causing an accidental fire. Particularly if this accidental fire occurs, the temperature of the fuel cells 2 cannot be increased or maintained at a high temperature, thereby potentially reducing the power output of the fuel cells 2 (cell stack devices 1).

Therefore, in the module 27 of the present embodiment as illustrated in FIG. 3, exhaust gas discharge paths 40 are formed between adjacent cell stack devices 1 in addition to the abovementioned exhaust gas discharge paths 39 in order to discharge the exhaust gas not used for power generation.

Figure 5A:
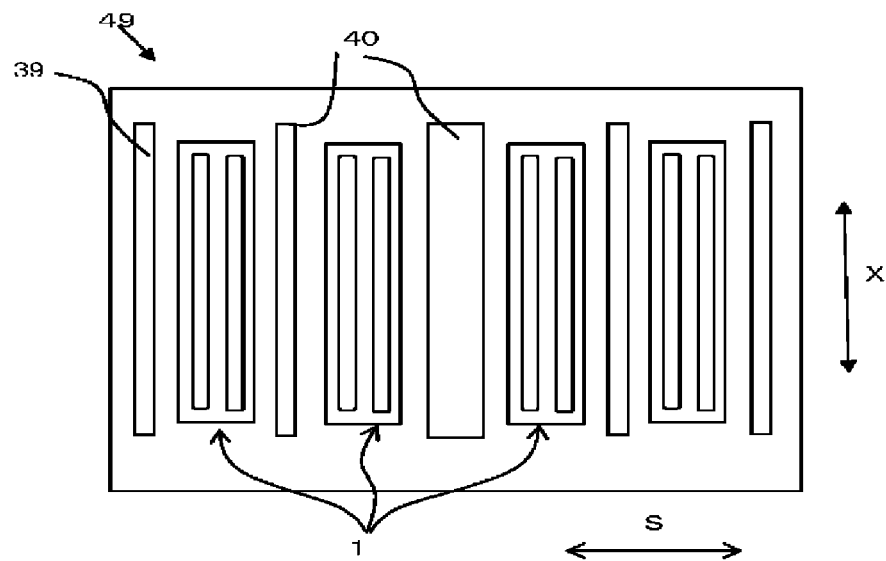
FIG. 5A illustrates the relationship between exhaust gas discharge paths and cell stack devices in the fuel cell module illustrated in FIG. 4.
Figure 5B:
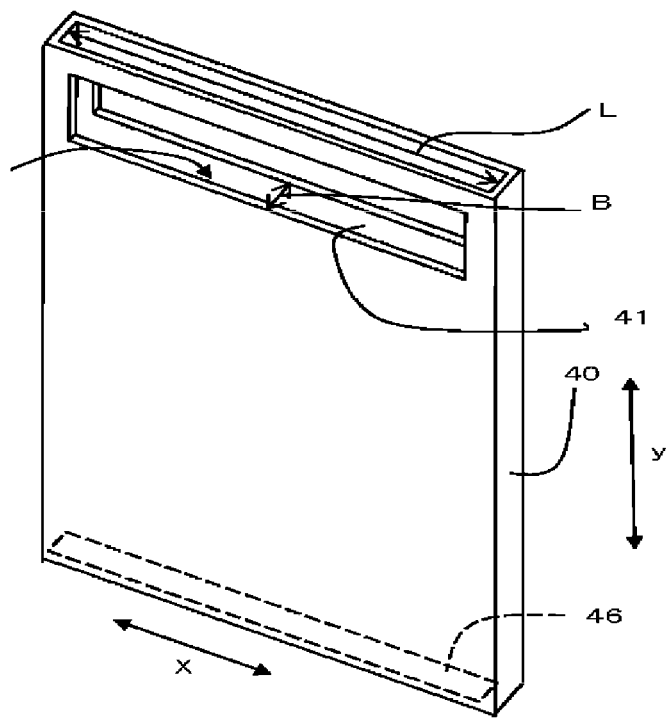
FIG. 5B is a perspective view of a hollow flat plate-shaped exhaust gas discharge member.

As illustrated in FIG. 5B, these exhaust gas discharge paths 40 are formed of hollow flat plate-shaped exhaust gas discharge members. Exhaust gas inlets 41 communicating to the power generation chamber 31 are formed on both sides at the top end of each exhaust gas discharge path 40. An exhaust outlet 46 formed at the bottom end of each exhaust gas discharge path 40 communicates to an exhaust gas storage chamber 42 formed at the bottom of the power generation chamber 31. Note that FIG. 5B illustrates an example in which the exhaust gas discharge path 40 is formed of a rectangular cuboid-shaped (hollow flat plate-shaped) exhaust gas discharge member. However, a plurality of cylinder-shaped exhaust gas discharge members may be arranged to form the exhaust gas discharge paths 40.

In other words, either the exhaust gas discharge path 39 or the exhaust gas discharge path 40 is arranged extending along each cell stack device 1. Exhaust gas not used for power generation can therefore flow efficiently to the exhaust gas discharge path 39 or 40 nearest to each cell stack 3 of each cell stack device 1.

This makes it possible to prevent exhaust gas from stagnating at the top ends of the fuel cells 2 and to efficiently discharge the exhaust gas. In cell stack devices 1 in which fuel gas is combusted at the top ends of the fuel cells 2, this makes it possible to prevent an accidental fire, thereby making it possible to provide a module 27 with improved power output.

Furthermore, the exhaust gas discharge paths 39 and 40 are communicated via the exhaust gas storage chamber 42 to an exhaust hole 47 formed at the bottom of the housing 28.

Accordingly, exhaust gas produced when the module 27 operates (during a startup process, power generation, or a shutdown process) flows through the exhaust gas discharge paths 39 and 40 and is temporarily collected in the exhaust gas storage chamber 42 before being discharged through the exhaust hole 47. Note that the exhaust hole 47 may be formed by cutting out a portion of the bottom of the housing 28 or by using a pipe-shaped member.

The oxygen-containing gas that is supplied to the fuel cells 2 is supplied through an oxygen-containing gas inlet (not illustrated) formed at the bottom of the housing 28 to an oxygen-containing gas leading-in chamber 43 formed beneath the exhaust gas storage chamber 42. The oxygen-containing gas supplied to the oxygen-containing gas leading-in chamber 43 flows through oxygen-containing gas leading-in members 32 positioned beside the exhaust gas discharge paths 39 to an oxygen-containing gas leading-in path formed at the top of the power generation chamber 31 and is then supplied to the fuel cells 2 via the oxygen-containing gas leading-in members 35.

While flowing through the oxygen-containing gas leading-in chamber 43, the oxygen-containing gas exchanges heat with the exhaust gas in the exhaust gas storage chamber 42. While flowing through the oxygen-containing gas leading-in members 32, the oxygen-containing gas exchanges heat with the exhaust gas flowing through the exhaust gas discharge paths 39. While flowing through the oxygen-containing gas leading-in path above the power generation chamber 31 and through the oxygen-containing gas leading-in members 35, the oxygen-containing gas exchanges heat with the power generation chamber 31. This makes it possible to supply high temperature oxygen-containing gas to the fuel cells 2, thereby making it possible to improve power generation efficiency.

Note that, inside the oxygen-containing gas leading-in members 35, thermocouples 44 for measuring the temperature near the cell stacks 3 are formed such that the temperature sensing portion 45 of each thermocouple 44 is positioned at the center of the fuel cells 2 in the lengthwise direction y and at the center in the direction x in which the fuel cells 2 are arranged.

In the module 27 configured as described above, fuel gas not used for power generation and discharged from the gas paths 11 of the fuel cells 2 as well as oxygen-containing gas (air) is combusted in the space between the top ends of the fuel cells 2 and the reformer 5. This makes it possible to increase or maintain the temperature of the fuel cells 2 and to heat the reformer 5 arranged above the fuel cells 2 (that is, above the cell stacks 3), thereby making it possible for the reformer 5 to efficiently carry out the reforming reaction. Furthermore, during normal power generation, the module 27 has a temperature of 500 to 800° C. due to the above-mentioned combustion process and due to the power generation in the fuel cells 2.

Figure 4:
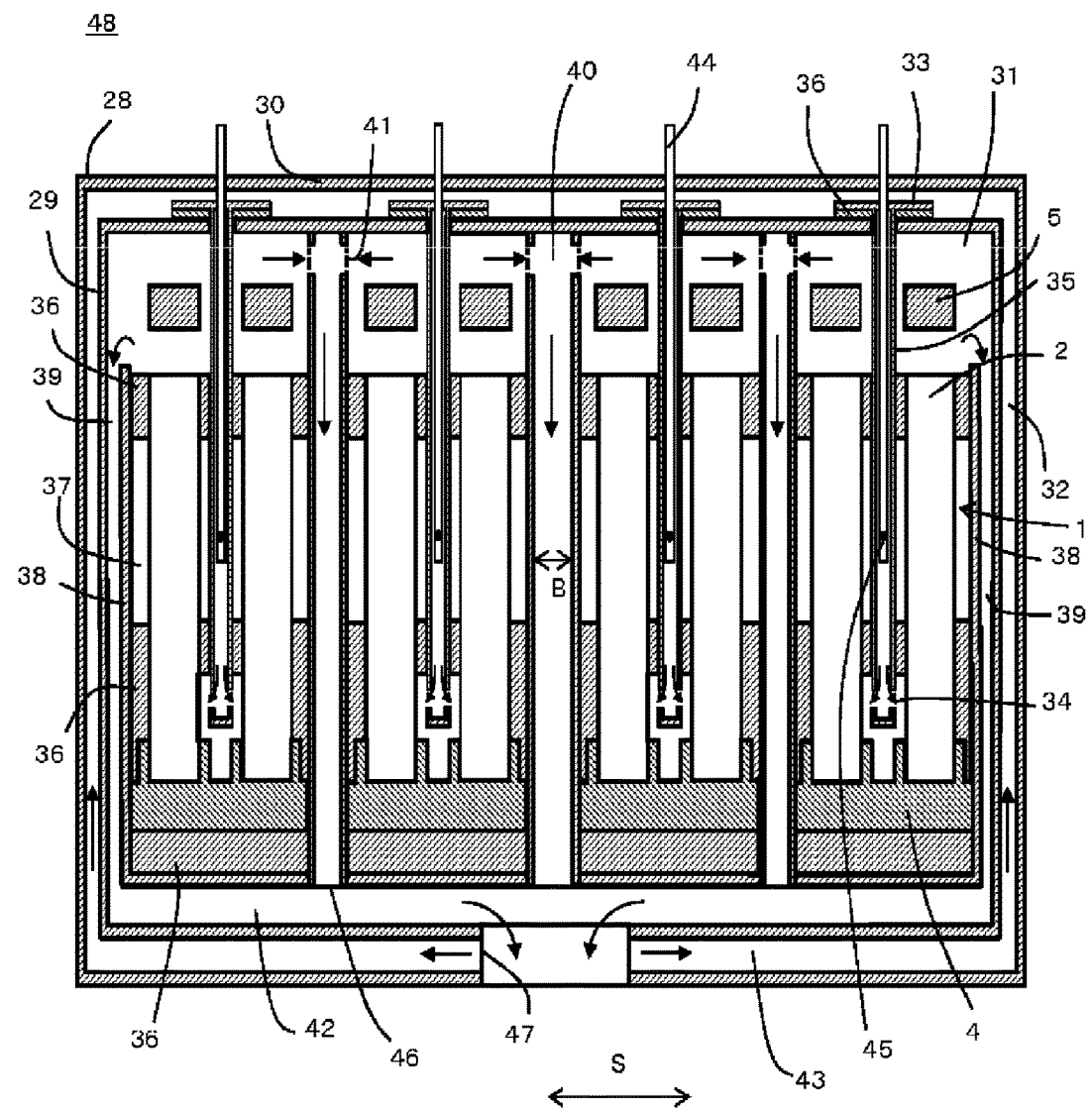
FIG. 4 is a vertical cross-sectional view illustrating another example of a fuel cell module according to the present embodiment.

FIG. 4 is a cross-sectional view illustrating another example of a fuel cell module according to the present embodiment. The module 48 illustrated in FIG. 4 is different from the module 27 illustrated in FIG. 3 in that, among the cross-sectional areas of the exhaust gas discharge paths arranged between the cell stack devices 1, the cross-sectional area of the path in the center of the power generation chamber 31 in the direction s in which the cell stack devices 1 are arranged is greater than the cross-sectional area of the paths on either end of the power generation chamber 31 in the direction s in which the cell stack devices 1 are arranged.

Modules in which a plurality of cell stack devices are housed within a housing exhibit a temperature distribution in which the temperature increases towards the center of the power generation chamber 31 in the direction s in which the cell stack devices 1 are arranged, thereby potentially reducing power generation efficiency.

Therefore, in the module 48 illustrated in FIG. 4, the width B of the exhaust gas discharge path 40 in the center of the power generation chamber 31 in the direction s in which the cell stack devices 1 are arranged is made greater than the width B of the exhaust gas discharge paths 40 on the ends of the power generation chamber 31 in the direction s in which the cell stack devices 1 are arranged, thereby increasing the cross-sectional area of the exhaust gas discharge path 40 in the center of the power generation chamber 31.

FIG. 5A illustrates the relationship between cell stack devices 1 and hollow flat plate-shaped exhaust gas discharge members which form the exhaust gas discharge paths 40. FIG. 5A is a view looking down from above on the cell stack devices 1 of the module 48 illustrated in FIG. 4. FIG. 5B is a perspective view of the exhaust gas discharge member which forms the exhaust gas discharge path 40.

In this configuration, more of the exhaust gas with a high temperature originating from the center of the power generation chamber 31 in the direction s in which the cell stack devices 1 are arranged is discharged. This makes it possible to reduce the temperature of the center of the power generation chamber 31 in the direction s in which the cell stack devices 1 are arranged, thereby making it possible to decrease the differences in temperature. This, in turn, makes it possible to improve the power generation efficiency of the module 48.

Note that in the example described above, the width B of the exhaust gas discharge paths 40 is changed while the length L of the exhaust gas discharge paths 40 in the direction x in which the fuel cells 2 are arranged is kept the same. However, as long as the cross-sectional area of the exhaust gas discharge path 40 in the center of the power generation chamber 31 in the direction s in which the cell stack devices 1 are arranged is greater than the cross-sectional area of the exhaust gas discharge paths 40 on the ends of the power generation chamber 31 in the direction s in which the cell stack devices 1 are arranged, the dimensions may be changed as appropriate such that, for example, the width B is kept the same and the length L is changed, or both the width B and the length L are changed. Any configuration may be used as long as the amount of exhaust gas discharged from the exhaust gas discharge path 40 in the center of the power generation chamber 31 in the direction s in which the cell stack devices 1 are arranged is greater than the amount of exhaust gas discharged from the exhaust gas discharge paths 40 on the ends of the power generation chamber 31 in the direction s in which the cell stack devices 1 are arranged.

Figure 6A:
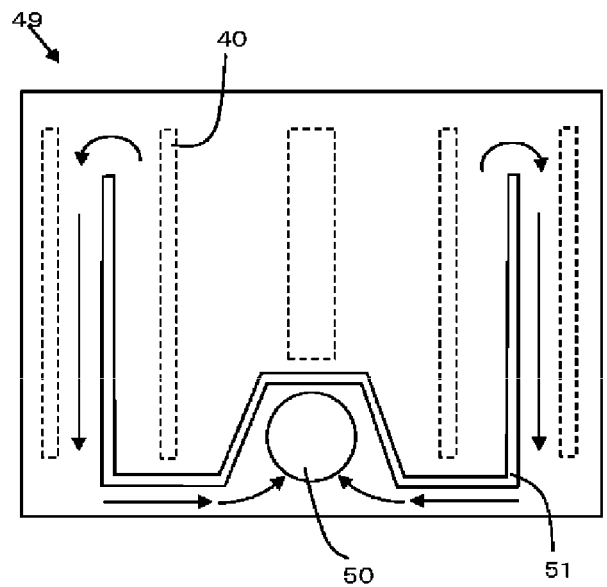
FIG. 6A is a partial plan view illustrating an example of an exhaust gas storage chamber formed in the fuel cell module according to the present embodiment.

FIG. 6A is a partial plan view illustrating an exhaust gas storage chamber 49 of a module according to the present embodiment.

In the modules 27 and 48 illustrated in FIGS. 3 and 4, efficiently exchanging heat between the exhaust gas flowing through the exhaust gas storage chamber 42 and the oxygen-containing gas flowing through the oxygen-containing gas leading-in chamber 43 makes it possible to supply high temperature oxygen-containing gas to the fuel cells 2, thereby making it possible to provide a module with improved power generation efficiency. Therefore, it is preferable that the distance that the exhaust gas flows inside the exhaust gas storage chamber 42 be made as long as possible.

In the example of an exhaust gas storage chamber 49 illustrated in FIG. 6A, part of the path in which the exhaust gas flows from the exhaust outlet 46 which is one end of the exhaust gas discharge paths 39 and 40 toward an exhaust hole 50 for discharging the exhaust gas outside is configured to have a meandering shape.

More specifically, a description will be given with reference to FIG. 6A. A guide 51 is formed inside the exhaust gas storage chamber 49. Exhaust gas that enters the exhaust gas storage chamber 49 via the exhaust outlets 46 flows along the guide 51 toward the sidewall side of the exhaust gas storage chamber 49 and then flows toward the front side (the bottom side in FIG. 6A). The exhaust gas then flows toward the center and is discharged outside of the module through the exhaust hole 50. In other words, part of the path through the exhaust gas storage chamber 49 is a meandering flow path.

This makes it possible to efficiently exchange heat between the exhaust gas flowing through the exhaust gas storage chamber 49 and the oxygen-containing gas flowing through the oxygen-containing gas leading-in chamber 43, thereby making it possible to supply high temperature oxygen-containing gas to the fuel cells 2 and to provide a module with improved power generation efficiency.

Note that the path through the exhaust gas storage chamber 49 may be configured as appropriate according to the dimensions and configuration of the exhaust gas storage chamber 49. The path is not necessarily limited to a meandering path and may be a radial shaped path, for example.

The oxygen-containing gas leading-in chamber 43 may also be configured to have a meandering or radial shaped path.

Figure 6B:
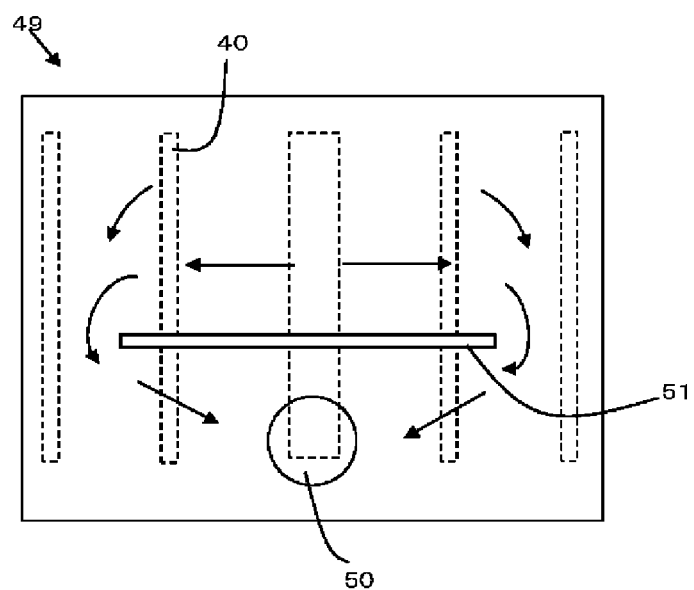
FIG. 6B is plan view illustrating another example of an exhaust gas storage chamber.

FIG. 6B illustrates another example of an exhaust gas storage chamber 49. In this exhaust gas storage chamber 49, a straight line-shaped guide 51 is arranged. The portions of the exhaust outlets 46 of the exhaust gas discharge paths 40 on the exhaust hole 50 side of the guide 51 are blocked, and the portions of the exhaust outlets 46 of the exhaust gas discharge paths 40 on the opposite side to the exhaust hole 50 of the guide 51 are open. In this way, the path through the exhaust gas storage chamber 49 is configured to have a meandering shape.

Figure 7:
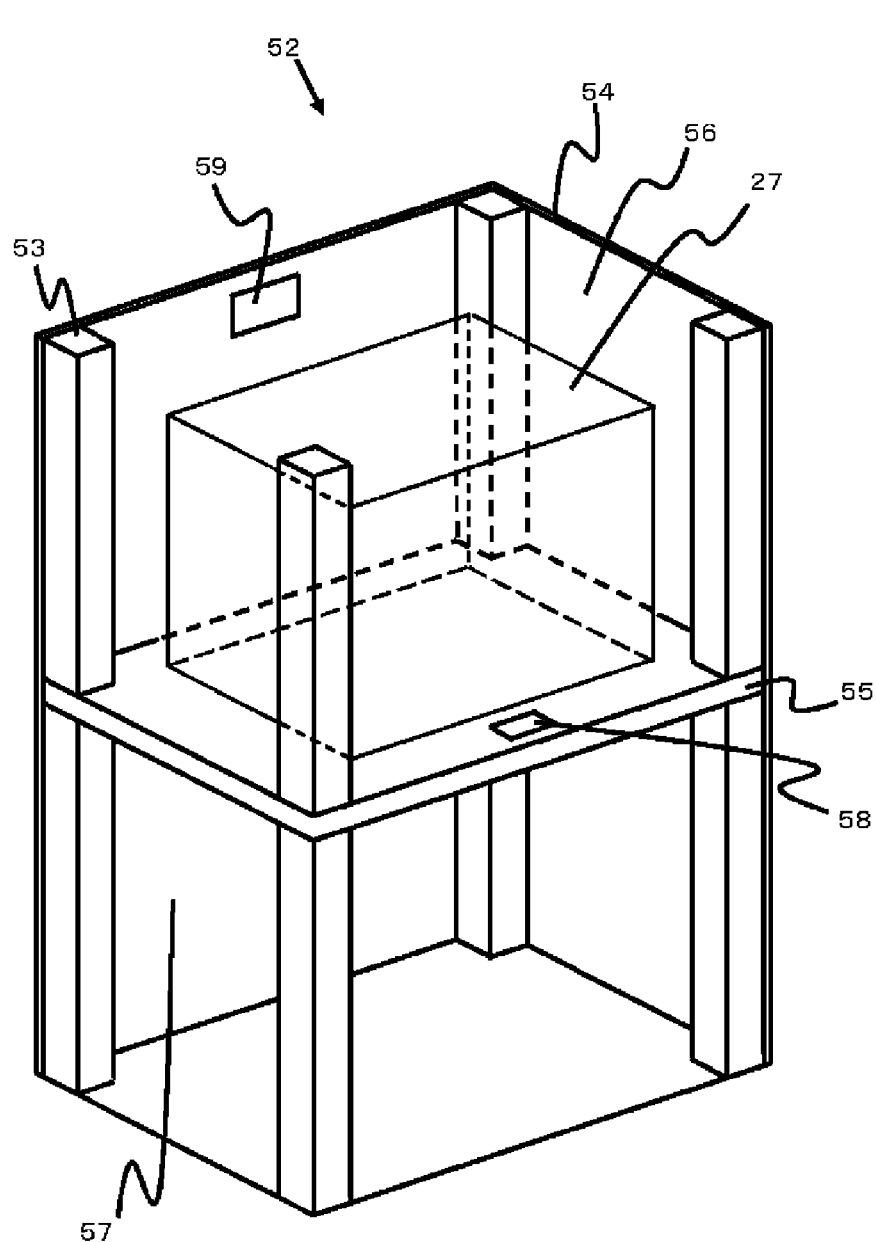
FIG. 7 is an exploded perspective view schematically illustrating an example of a fuel cell device according to the present embodiment.

FIG. 7 is an exploded perspective view illustrating an example of a fuel cell device according to the present embodiment in which the fuel cell module 27 illustrated in FIG. 3 and an auxiliary device (not illustrated) for operating the fuel cell module 27 are housed in an outer casing. Note that some of the components of the configuration are not illustrated in FIG. 7.

In the fuel cell device 52 illustrated in FIG. 7, an outer casing formed of struts 53 and outer plates 54 is divided into an upper and a lower region using a divider 55. The upper region forms a module housing chamber 56 for housing the fuel cell module 27. The lower region forms an auxiliary device housing chamber 57 for housing the auxiliary device for operating the fuel cell module 27. Note that the auxiliary device housed in the auxiliary device housing chamber 57 is not illustrated in FIG. 7.

Furthermore, an airflow hole 58 for allowing air in the auxiliary device housing chamber 57 to flow into the module housing chamber 56 is formed in the divider 55, and an exhaust hole 59 for exhausting air out of the module housing chamber 56 is formed in one of the outer plates 54 of the module housing chamber 56.

In this fuel cell device 52, the fuel cell module 27 or 48 having improved long-term reliability as described above is housed in the module housing chamber 56, and the auxiliary device for operating the fuel cell module 27 or 48 is housed in the auxiliary device housing chamber 57. This configuration makes it possible to provide a fuel cell device 52 with improved power output.

Figure 8:
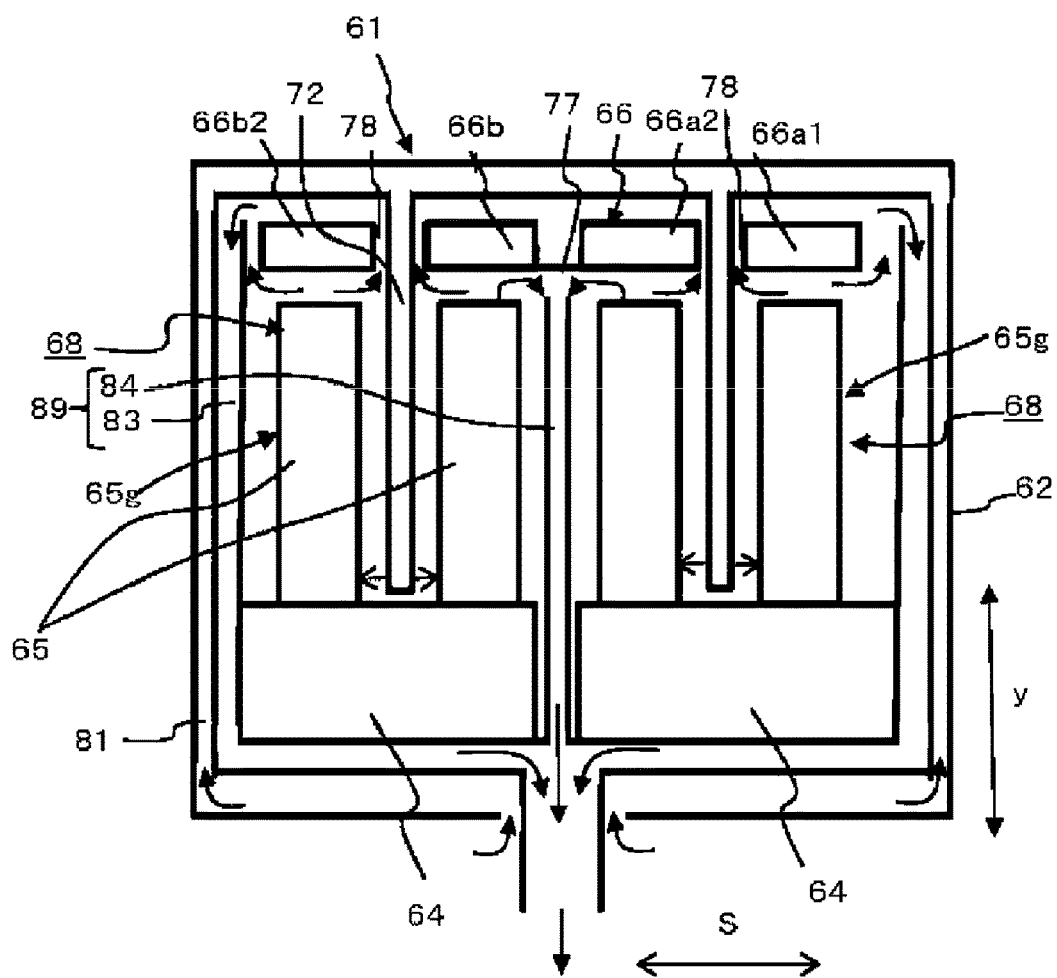
FIG. 8 is a vertical cross-sectional view of another example of a fuel cell module.

FIG. 8 is a vertical cross-sectional view of another example of a fuel cell module. Note that the same reference characters are used for components that are the same as components illustrated in the other figures.

Figure 9A:
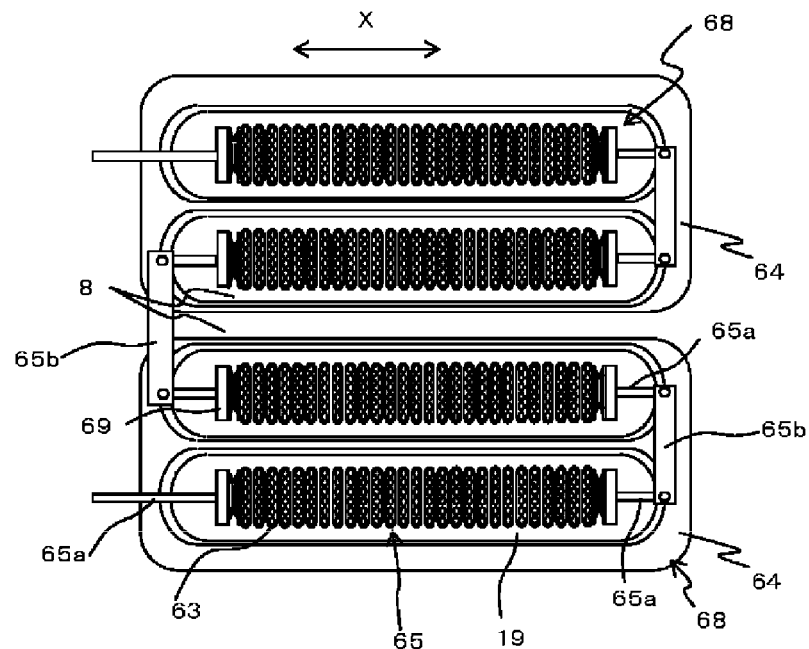
FIG. 9A is a plan view illustrating how two cell stack devices each including two cell stacks are arranged.
Figure 9B:
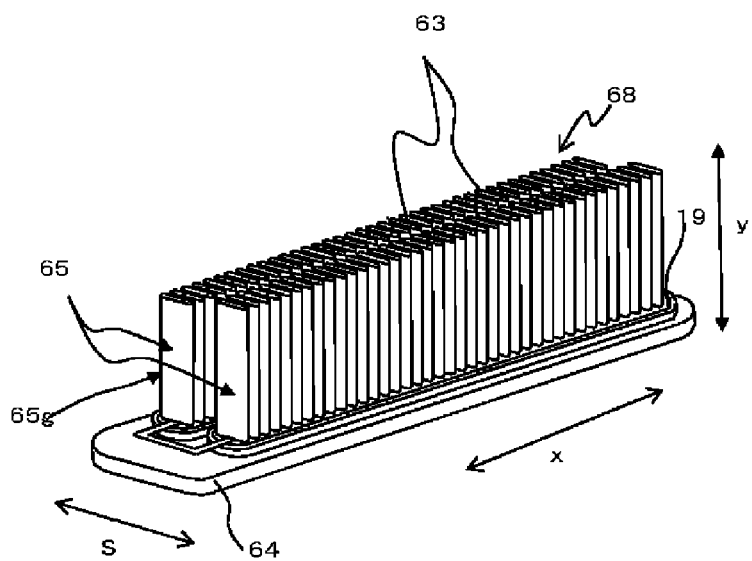
FIG. 9B is a perspective view of a cell stack device in which two cell stacks are formed on a manifold.

The module 61 illustrated in FIG. 8 includes four cell stacks 65 housed inside a rectangular cuboid-shaped housing 62. As illustrated in FIGS. 9A and 9B, fuel cells 63 each having fuel gas paths erectly arranged in a row. Adjacent fuel cells 63 are electrically connected in series using current collectors (not illustrated).

As illustrated in FIG. 9A, leads 65a are connected to both ends of each of the four cell stacks 65. Adjacent leads 65a on one side are connected to a connector 65b, thereby electrically connecting the four cell stacks 65 in series.

Figure 10A:
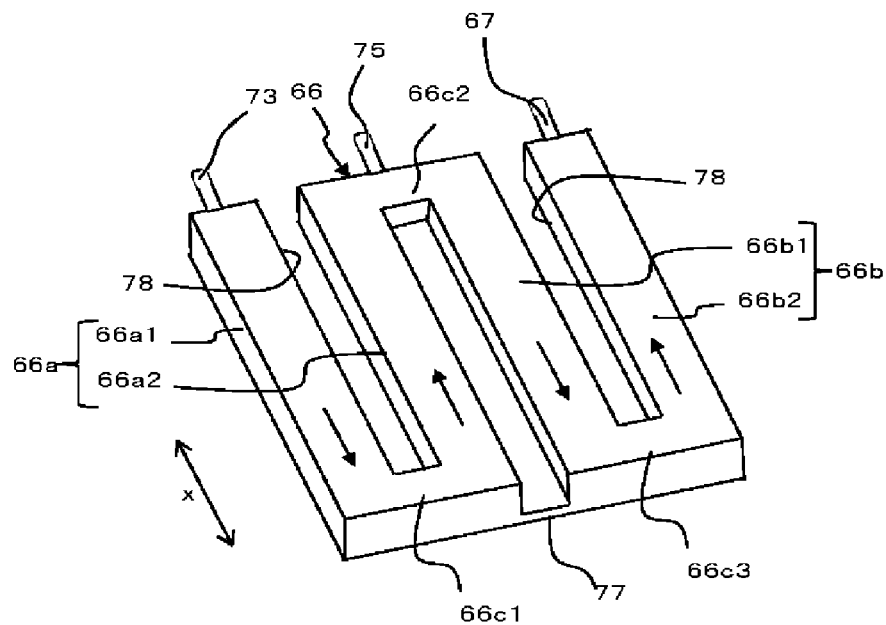
FIGS. 10A and 10B illustrate a reformer.
Figure 10B:
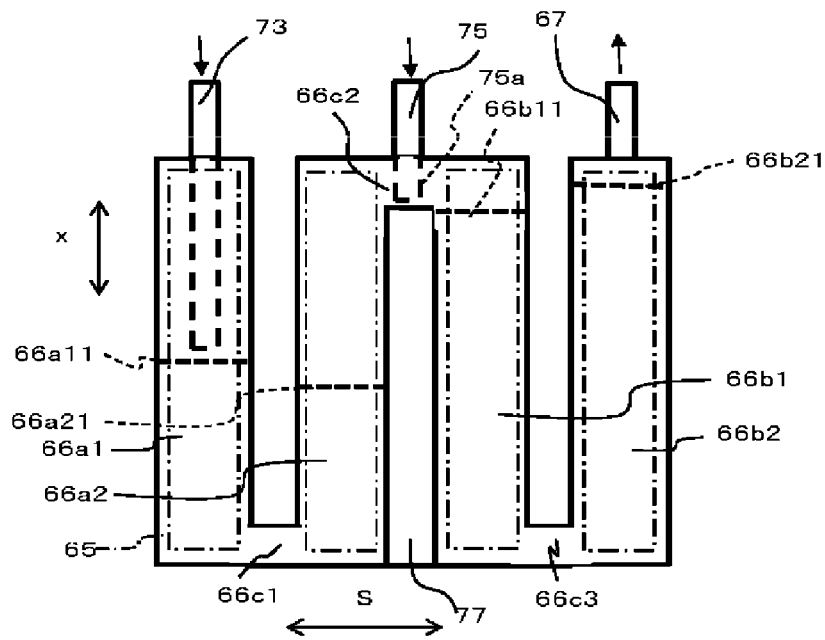
Figure 11:
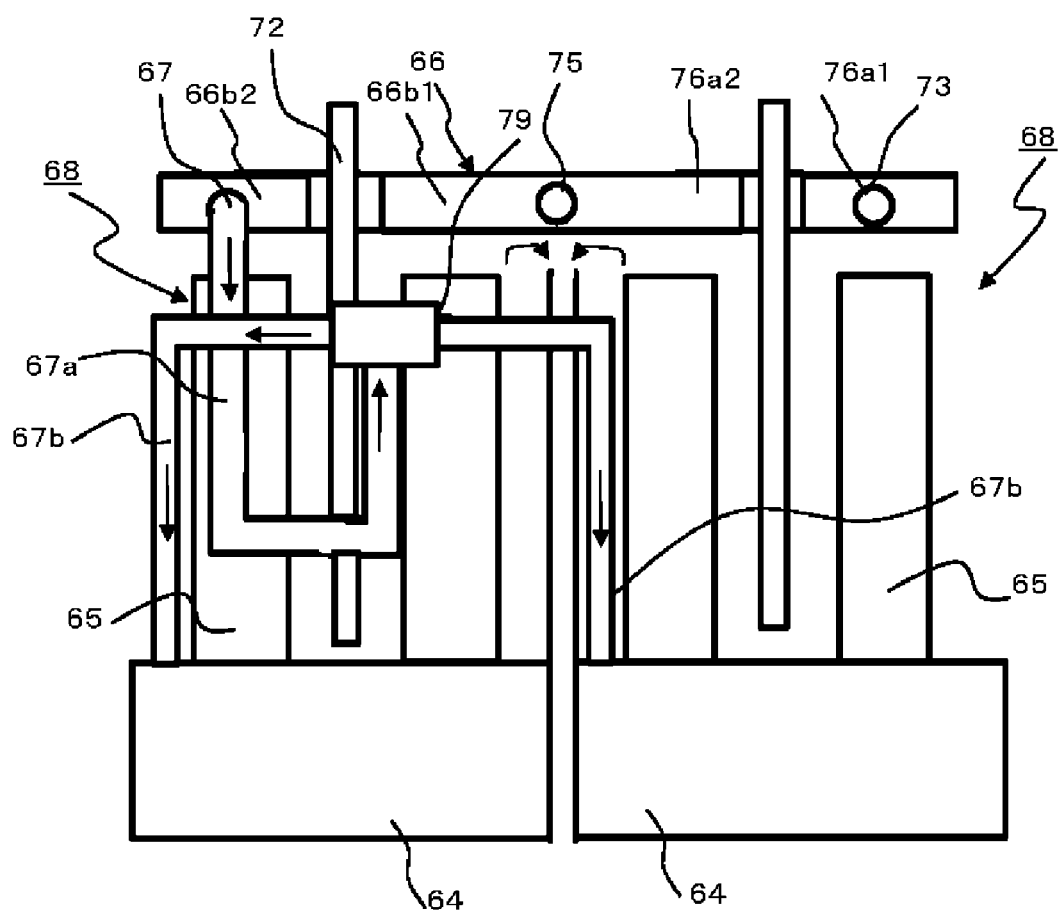
FIG. 11 is a side view illustrating a cell stack device and the nearby areas.

Moreover, the fuel cells 63 illustrated in FIGS. 8, and 9A and 9B have the same structure as the fuel cells 2 illustrated in FIGS. 2A and 2B. As illustrated in FIGS. 10A and 10B, in order to obtain reformed gas for use in the fuel cells 63, a W-shaped (meandering-shaped) reformer 66 for reforming a fuel such as natural gas or kerosene to produce a fuel gas (hydrogen-containing gas) is arranged above the four cell stacks 65. Furthermore, as illustrated in FIG. 11, the fuel gas (reformed gas) produced by the reformer 66 is supplied to two manifolds 64 via a reformed gas leading-out pipe 67. The fuel gas is then supplied via the manifolds 64 to the fuel gas paths formed inside the fuel cells 63. This forms a cell stack device 68. In other words, as illustrated in FIG. 8, the cell stack device 68 includes the manifolds 64 and the cell stacks 65 fixed to the manifolds 64.

Leftover fuel gas that enters the fuel gas paths of the fuel cells 63 but is not used for power generation is emitted to the top of the fuel cells 63. This leftover fuel gas can be reacted with oxygen-containing gas (air) supplied to the outsides of the fuel cells 63 and combusted.

As illustrated in FIGS. 10A and 10B, the reformer 66 includes a vaporizing unit 66a that vaporizes water to produce steam and a reforming unit 66b that steam-reforms a raw fuel gas using the steam produced by the vaporizing unit 66a.

The vaporizing unit 66a includes a vaporizing unit forward path 66a1 to which a water supply pipe 73 for supplying water is connected and a vaporizing unit return path 66a2 through which the steam flows. The reforming unit 66b includes a reforming unit forward path 66b1 that reforms raw fuel gas supplied by a raw fuel gas supply pipe 75 and a reforming unit return path 66b2 connected to a reformed gas leading-out pipe 67 for leading out the reformed gas. The water supply pipe 73, the raw fuel gas supply pipe 75, and the reformed gas leading-out pipe 67 are all connected to one side of the reformer 66 and led out in the same direction.

The four cell stacks 65 are arranged beneath the respective vaporizing unit forward path 66a1, vaporizing unit return path 66a2, reforming unit forward path 66b1, and reforming unit return path 66b2. The vaporizing unit forward path 66a1, the vaporizing unit return path 66a2, the reforming unit forward path 66b1, and the reforming unit return path 66b2 extend in the direction x in which the fuel cells 63 of the cell stacks 65 are arranged. In FIG. 10B, the cell stacks 65 are indicated by the long dashed short dashed lines.

The vaporizing unit forward path 66a1 and the vaporizing unit return path 66a2 are connected by a vaporizing unit connecting path 66c1. The vaporizing unit return path 66a2 and the reforming unit forward path 66b1 are connected by a vaporizing unit and reforming unit connecting path 66c2. The vaporizing unit forward path 66b1 and the vaporizing unit return path 66b2 are connected by a reforming unit connecting path 66c3. The raw fuel gas supply pipe 75 is connected to the vaporizing unit and reforming unit connecting path 66c2.

The raw fuel gas supply pipe 75 is connected to the vaporizing unit and reforming unit connecting path 66c2, which is positioned downstream of the vaporizing unit forward path 66a1 to which the water supply pipe 73 is connected. Therefore, even if the raw fuel gas has a low temperature, most of the supplied water will have been vaporized by the time the raw fuel gas is added and mixed. Therefore, this configuration makes it possible to inhibit a decrease in the temperature in one portion of the reformer 66 (the vaporizing unit forward path 66a1). This makes it possible to inhibit a decrease in power generation performance by inhibiting a decrease in temperature in the cell stack 65 arranged beneath the vaporizing unit forward path 66a1 of the reformer 66, thereby making it possible to improve the overall power generation performance of the module 61.

The reformer 66 is heated by the reaction heat from the fuel cells 63 and by the combustion heat from the leftover fuel gas from the fuel cells 63. This heat vaporizes the water supplied to the vaporizing unit forward path 66a1, and the resulting steam flows in the order through the vaporizing unit connecting path 66c1, the vaporizing unit return path 66a2, the vaporizing unit and reforming unit connecting path 66c2, and the reforming unit forward path 66b1. Moreover, in the vaporizing unit and reforming unit connecting path 66c2, a raw fuel gas is supplied from the raw fuel gas supply pipe 75 and is mixed with the steam. The resulting mixture is reformed as the mixture flows through the reforming unit forward path 66b1, the reforming unit connecting path 66c3, and the reforming unit return path 66b2 to produce a hydrogen-containing reformed gas (fuel gas) that is then led out to the manifolds 64 via the reformed gas leading-out pipe 67.

The vaporizing unit forward path 66a1, the vaporizing unit return path 66a2, the reforming unit forward path 66b1, the reforming unit return path 66b2, the vaporizing unit connecting path 66c1, the vaporizing unit and reforming unit connecting path 66c2, and the reforming unit connecting path 66c3 are all formed of pipes having a rectangular cross-sectional shape. The spaces between the pipes that form the vaporizing unit forward path 66a1 and the vaporizing unit return path 66a2 and between the pipes that form the reforming unit forward path 66b1 and the reforming unit return path 66b2 form exhaust gas discharge paths 78. As illustrated in FIG. 8, oxygen-containing gas leading-in members 72 are inserted into these exhaust gas discharge paths 78, and the ends of those oxygen-containing gas leading-in members 72 are positioned near the bottoms of the spaces between the cell stacks 65.

Meanwhile, the space between the pipes that form the vaporizing unit return path 66a2 and the reforming unit forward path 66b1 is blocked by a connecting plate 77.

Dividers 66a11 and 66a21 are formed in the vaporizing unit forward path 66a1 and the vaporizing unit return path 66a2, respectively, at the centers of those paths in the direction x in which the fuel cells 63 are arranged. The space between these dividers 66a11 and 66a21 forms a vaporization chamber. As illustrated in FIG. 10B, the end portion (supply portion) of the water supply pipe 73 is positioned upstream of the divider 66a11 and supplies water to a position just before the vaporization chamber. The vaporization chamber includes ceramic balls for promoting vaporization. The dividers 66a11 and 66a21 are formed such that steam can pass through but the ceramic balls cannot. The water supply pipe 73 is configured to supply water to the vaporization chamber at a point above the center of the cell stack 65 in the direction x in which the fuel cells 63 are arranged. This center portion in the direction x in which the fuel cells 63 are arranged is prone to becoming heated to high temperatures, thereby making it possible to promote vaporization.

Furthermore, dividers 66b11 and 66b21 are formed in the reforming unit forward path 66b1 and the reforming unit return path 66b2, respectively. The portions of the reforming unit forward path 66b1, the reforming unit connecting path 66c3, and the reforming unit return path 66b2 between these dividers 66b11 and 66b21 form a reforming chamber. A reforming catalyst is housed within this reforming chamber. The dividers 66b11 and 66b21 are configured such that gases such as the steam, raw fuel gas, and reformed gas can pass through but the reforming catalyst cannot.

Figure 12A:
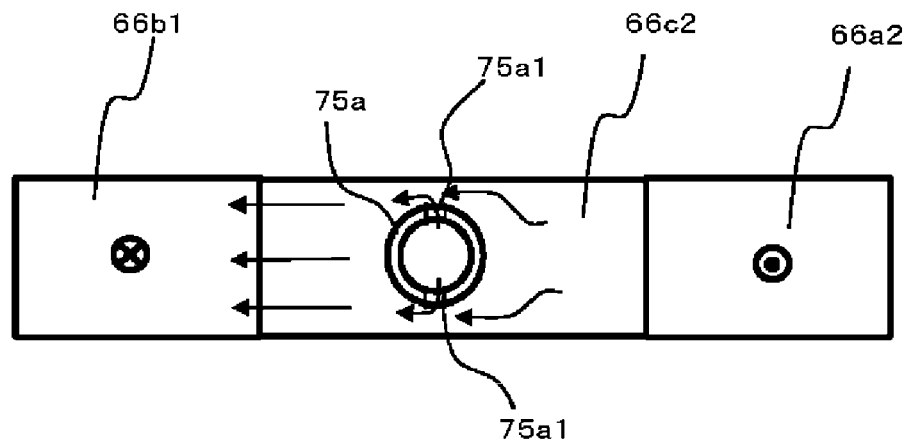
FIGS. 12A and 12B illustrate a raw fuel gas supply pipe and a nearby reformer.
Figure 12B:
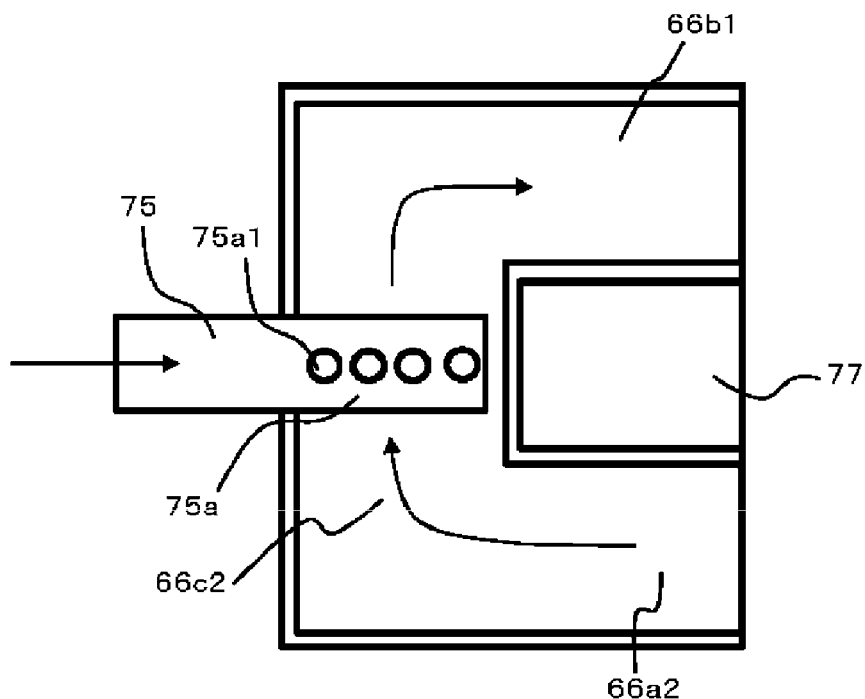

Furthermore, the raw fuel gas supply pipe 75 connected to the vaporizing unit and reforming unit connecting path 66c2 goes through the wall of the pipe that forms the vaporizing unit and reforming unit connecting path 66c2. The end of the raw fuel gas supply pipe 75 includes a protruding portion 75a that protrudes into the vaporizing unit and reforming unit connecting path 66c2. As illustrated in FIGS. 12A and 12B, a plurality of through holes 75a1 are formed in the top and bottom of this protruding portion 75a at prescribed intervals. The steam flows as if sliding on the outer surface of the protruding portion 75a of the raw fuel gas supply pipe 75 in which the through holes 75a1 are formed. In this case, the through holes 75a1 are configured such that the steam is mixed with the raw fuel gas coming out of the through holes 75a1. The end of the protruding portion 75a may be open or closed. However, when the end is open, it is preferable that the opening be positioned near the wall of the pipe.

In other words, the raw fuel gas supply pipe 75 includes a protruding portion 75a formed in the vaporizing unit and reforming unit connecting path 66c2 such that the direction in which the raw fuel gas flows through the raw fuel gas supply pipe 75 intersects with the direction in which the steam flows. Raw fuel gas flows out of the through holes 75a1, thereby making it possible to promote mixing of the raw fuel gas with the steam.

Furthermore, as illustrated in FIG. 11, the fuel gas that is led out of the reformer 66 is supplied to the two manifolds 64 via the reformed gas leading-out pipe 67 and a distributor 79. In other words, the reformed gas leading-out pipe 67 includes a first reformed gas leading-out pipe 67a that has a U shape extending from the reformer 66 to the distributor 79 and second reformed gas leading-out pipes 67b that extend downward from the distributor 79 to the respective manifolds 64. The first reformed gas leading-out pipe 67a and the second reformed gas leading-out pipes 67b are configured to have the same length and cross-sectional area (pressure loss) such that an equal amount of reformed gas is supplied to each manifold 64.

As illustrated in FIG. 8, the fuel cell module 61 includes two cell stack devices 68 housed within the housing 62 as well as an exhaust gas discharge path 89 through which exhaust gas from the cell stacks 65 flows from the top to the bottom of the cell stacks 65.

This exhaust gas discharge path 89 is formed in alternation with the cell stack device 68. The exhaust gas discharge path 89 includes high exhaust gas discharge paths 83 having inlets positioned at the same height or above the reformer 66 and a low exhaust gas discharge path 84 having an inlet positioned below the reformer 66. The high exhaust gas discharge paths 83 are formed of first exhaust gas discharge members, and the low exhaust gas discharge paths 84 are formed of a second exhaust gas discharge member.

In other words, on the inner walls of the housing 62 in the direction s in which the cell stacks 65 are arranged (that is, a direction orthogonal to the direction x in which the fuel cells 63 are arranged), oxygen-containing gas leading-in members 81 and the high exhaust gas discharge paths 83 are formed in order from outside to inside. The oxygen-containing gas leading-in members 81 are formed extending along the sides of the housing 62 from bottom to top and configured to supply oxygen-containing gas to the oxygen-containing gas leading-in members 72.

Meanwhile, the high exhaust gas discharge paths 83 are formed extending along the sides of the housing 62 to the bottom thereof. Exhaust gas from the top ends of the fuel cells 63 flows through the exhaust gas discharge paths 78 formed by the spaces between the pipes that form the vaporizing unit forward path 66a1 and the vaporizing unit return path 66a2 and between the pipes that form the reforming unit forward path 66b1 and the reforming unit return path 66b2. The exhaust gas above the reformer 66 then flows along the sides of the housing 62 through the high exhaust gas discharge paths 83 and is discharged from an exhaust hole. The oxygen-containing gas flowing through the oxygen-containing gas leading-in members 81 exchanges heat with the exhaust gas flowing through the high exhaust gas discharge paths 83.

Moreover, the low exhaust gas discharge path 84 is arranged beneath the connecting plate 77 between the vaporizing unit return path 66a1 and the reforming unit forward path 66b1 in order to discharge the exhaust gas beneath the reformer 66 to lower places of the cell stacks 65. In other words, the bottom of the space between the pipes that form the vaporizing unit return path 66a2 and the reforming unit forward path 66b1 is blocked by the connecting plate 77. The low exhaust gas discharge path 84 is formed beneath this connecting plate 77, and the bottom end of the low exhaust gas discharge path 84 connects with the downstream ends of the high exhaust gas discharge paths 83.

The exhaust gas discharge path 89 includes the high exhaust gas discharge paths 83 and the low exhaust gas discharge path 84. The exhaust gas discharge path 89 is arranged in alternation with the two cell stack devices 68, with the high exhaust gas discharge paths 83 being arranged on one side of each cell stack device 68 and the low exhaust gas discharge path 84 being arranged on the other side of the cell stack device 68.

In the module 61 as described above, the exhaust gas can still be sufficiently discharged via the high exhaust gas discharge paths 83 and the low exhaust gas discharge path 84 even if the number of cell stacks is large. Moreover, the exhaust gas flows along the top, bottom, and side surfaces of the vaporizing unit forward path 66a1, the vaporizing unit return path 66a2, the reforming unit forward path 66b1, and the reforming unit return path 66b2, thereby making it possible to efficiently heat the reformer 66 using the exhaust gas.

Note that in the example described above, the raw fuel gas supply pipe 75 is connected to the vaporizing unit and reforming unit connecting path 66c2. However, the present embodiment is not limited to this configuration. Any configuration may be used as long as the point at which the raw fuel gas supply pipe 75 supplies the raw fuel gas is positioned downstream of the vaporizing unit forward path 66a1 to which the water supply pipe 73 is connected. For example, the raw fuel gas supply pipe 75 may be connected to the downstream end of the vaporizing unit return path 66a2 or to the upstream end of the reforming unit forward path 66b1.

Moreover, in the example described above, the raw fuel gas supply pipe 75 includes the protruding portion 75a that protrudes into the vaporizing unit and reforming unit connecting path 66c2. However, as illustrated in FIG. 13A, even if the protruding portion is not included, the raw fuel gas supply pipe 75 can still supply raw fuel gas to the vaporizing unit and reforming unit connecting path 66c2 of the reformer 66, which allows the raw fuel gas to mix with the steam.

Furthermore, in the example described above, the divider 66a21 is positioned in the center of in the direction x in which the fuel cells 63 of the cell stacks 65 are arranged. However, as illustrated in FIG. 13B, it is preferable that the divider 66a21 be positioned closer to the raw fuel gas supply pipe 75 rather than in the center in the direction x in which the fuel cells 63 of the cell stacks 65 are arranged because this configuration makes it possible to more efficiently use the heat in the center in the direction x in which the fuel cells 63 of the cell stacks 65 are arranged to vaporize the water.

Moreover, as illustrated in FIG. 14, in the reformer 66 it is preferable that reinforcing plates 85 connect the adjacent end faces of the vaporizing unit forward path 66a1 and the vaporizing unit return path 66a2 and connect the adjacent end faces of the reforming unit forward path 66b1 and the reforming unit return path 66b2. This makes it possible to reinforce the reformer 66.

Furthermore, in the example illustrated in FIG. 8, the bottom (cell stack 65 side) of the space between the pipes that form the vaporizing unit return path 66a2 and the reforming unit forward path 66b1 is blocked by the connecting plate 77, and the low exhaust gas discharge path 84 is formed beneath this connecting plate 77. However, as illustrated in FIG. 15, the top (housing 62 wall side) of the space between the pipes that form the vaporizing unit return path 66a2 and the reforming unit forward path 66b1 may be blocked by the connecting plate 77, and the low exhaust gas discharge path 84 may be formed beneath this connecting plate 77. Note that the connecting plate 77 may be removed as long as the low exhaust gas discharge path 84 is positioned beneath the reformer 66.

In the fuel cell module 61 described above, exhaust gas from the top ends of the fuel cells 63 flows across and heats the bottom and side surfaces of the vaporizing unit return path 66a2 and the reforming unit forward path 66b1. The exhaust gas can then be discharged through an exhaust gas leading-out pipe 91 to further heat the vaporizing unit return path 66a2 and the reforming unit forward path 66b1.

Furthermore, in the example illustrated in FIG. 8, the bottom (cell stack 65 side) of the space between the pipes that form the vaporizing unit return path 66a2 and the reforming unit forward path 66b1 is blocked by the connecting plate 77, and the low exhaust gas discharge path 84 is formed beneath this connecting plate 77. However, as illustrated in FIG. 16, the bottom (cell stack 65 side) of the space between the pipes that form the vaporizing unit return path 66a2 and the reforming unit forward path 66b1 may be connected by a connecting plate 91, an exhaust gas hole 93 may be formed in this connecting plate 91, and the low exhaust gas discharge path 84 may be formed beneath this exhaust gas hole 93.

In the fuel cell module 61 described above, exhaust gas from the top ends of the fuel cells 63 flows across and heats the bottom and side surfaces of the vaporizing unit return path 66a2 and the reforming unit forward path 66b1. This exhaust gas can then be discharged through the low exhaust gas discharge path 84. The exhaust gas that flows across the top surfaces of the vaporizing unit return path 66a2 and the reforming unit forward path 66b1 can also be discharged through the low exhaust gas discharge path 84, thereby making it possible to further heat the vaporizing unit return path 66a2 and the reforming unit forward path 66b1.

In this type of fuel cell device, the module 61 described above is housed inside an outer casing, thereby making it possible to provide a fuel cell device with improved power generation efficiency.

FIG. 17 illustrates another example of a fuel cell module 61. As illustrated in FIG. 17, in this fuel cell module 61, the two cell stack devices 68 are housed inside the housing 62. On the side walls on both sides of the housing 62 in the direction in which the cell stacks 65 are arranged (that is, a direction orthogonal to the direction x in which the fuel cells 63 are arranged), oxygen-containing gas leading-in members 81 and exhaust gas discharge paths 83 are formed in order from outside to inside. The oxygen-containing gas leading-in members 81 are formed extending along the sides of the housing 62 from bottom to top and configured to supply oxygen-containing gas to the oxygen-containing gas leading-in members 72.

A reformer 66 is arranged above the two cell stack devices 68. As illustrated in FIGS. 18A and 18B, this reformer 66 is identical to the reformer 66 illustrated in FIGS. 10A and 10B except that an exhaust gas hole 87a is formed in a connecting plate 87.

The exhaust gas discharge paths 83 are formed extending along the sides of the housing 62 to the bottom thereof. Exhaust gas from the top ends of the fuel cells 63 flows through the exhaust gas discharge paths 78 formed by the spaces between the pipes that form the vaporizing unit forward path 66a1 and the vaporizing unit return path 66a2 and between the pipes that form the reforming unit forward path 66b1 and the reforming unit return path 66b2. The exhaust gas above the reformer 66 then flows along the sides to the bottom of the housing 62 through the exhaust gas discharge paths 83 and is then discharged from an exhaust hole. The oxygen-containing gas flowing through the oxygen-containing gas leading-in members 81 exchanges heat with the exhaust gas flowing through the exhaust gas discharge paths 83.

Furthermore, an exhaust gas discharge path 89 is formed connected at one end to the exhaust gas hole 87a in the connecting plate 87 between the vaporization unit return path 66a2 and the reforming unit forward path 66b1 and connected at the other end to the downstream sides of the exhaust gas paths 83.

The exhaust gas discharge paths 83 and 89 are arranged in alternation with the two cell stack devices 68, with the exhaust gas discharge paths 83 being arranged on one side of each cell stack device 68 and the exhaust gas discharge path 89 being arranged on the other side of the cell stack devices 68.

In the cell stack device as described above, the exhaust gas can still be sufficiently discharged via the exhaust gas discharge paths 83 and 89 even if the number of cell stacks is large. Moreover, the exhaust gas flows along the top, bottom, and side surfaces of the vaporizing unit forward path 66a1, the vaporizing unit return path 66a2, the reforming unit forward path 66b1, and the vaporizing reforming unit return path 66b2, thereby making it possible to efficiently heat the reformer 66 using the exhaust gas.

Furthermore, in the example illustrated in FIG. 17, the bottom (cell stack 65 side) of the space between the pipes that form the vaporizing unit return path 66a2 and the reforming unit forward path 66b1 is blocked by the connecting plate 87, and the exhaust gas discharge path hole 87a in the connecting plate 87 is connected to the exhaust gas discharge path 89. However, as illustrated in FIG. 19, the top (housing wall side) of the space between the pipes that form the vaporizing unit return path and the reforming unit forward path may be blocked by the connecting plate 87, and the exhaust gas discharge path hole 87a in the connecting plate 87 may be connected to the exhaust gas discharge path 89.

Furthermore, as illustrated in FIG. 20, the opening of the exhaust gas discharge path 89 may be positioned beneath the reformer 66. Insulating members 95 may be formed on both sides of the exhaust gas discharge path 89. Blocking members 97 may be formed above the insulating members 95 such that exhaust gas does not pass through the space between the tops of the insulating members 95 and the reformer 66. In this configuration, only the exhaust gas above the reformer 66 is discharged via the space between the blocking members 97 and then through the exhaust gas discharge path 89.

The modules illustrated in FIGS. 8 to 20 may be disposed within the module housing chamber 56 of the fuel cell device illustrated in FIG. 7 to form a fuel cell device.

The present invention has been described in detail above. However, the present invention is not limited to the embodiments described above, and various modifications or improvements can be made without departing from the spirit of the invention.

The examples described above and illustrated in FIGS. 1 to 20 employ so-called vertical fuel cells. However, so-called horizontal fuel cells in which a plurality of power generating devices are formed on an insulating support substrate may also be used.

Moreover, in the examples illustrated in FIGS. 1 to 6B, the modules 27 and 48 include four cell stack devices 1. However, the modules may include two, three, or five or more cell stack devices 1. Furthermore, in the examples illustrated in FIGS. 1 to 6B, the exhaust gas discharge paths 40 are formed between each cell stack device 1. However, the exhaust gas discharge paths 40 do not necessarily need to be formed between each cell stack device 1, and the exhaust gas discharge paths 40 may only be formed in every other space between adjacent cell stack devices 1, for example.

Moreover, in the examples illustrated in FIGS. 8 and 17, a single reformer 66 is arranged above four cell stacks 65. However, a single reformer may be arranged above two or three cell stacks, or a single reformer 6 may be arranged above five or more cell stacks, for example.

Furthermore, in the examples illustrated in FIGS. 8 and 17, two cell stacks 65 are arranged on each manifold 64. However, one cell stack may be arranged on each manifold, or three or more cell stacks may be arranged on each manifold.

In addition, in the examples illustrated in FIGS. 8 and 17, the cell stack devices 68 each include two cell stacks 65. However, each cell stack device 68 may include a single cell stack 65, or each cell stack device 68 may include three or more cell stacks 65.

Moreover, in the example illustrated in FIG. 8, the exhaust gas discharge path 89 includes two high exhaust gas discharge paths 83 and a single low exhaust gas discharge path 84. However, the exhaust gas discharge path may include three or more high exhaust gas discharge paths and a single low exhaust gas discharge path, two high exhaust gas discharge paths and two or more low exhaust gas discharge paths, or three or more high exhaust gas discharge paths and two or more low exhaust gas discharge paths.

Furthermore, in the example illustrated in FIG. 8, the high exhaust gas discharge paths 83 are formed along the sidewalls of the housing 62. However, the low exhaust gas discharge path may also be formed along the sidewalls of the housing. In the example illustrated in FIG. 8, low exhaust gas discharge paths may be formed along the sidewalls of the housing 62, and a high exhaust gas discharge path may be formed between the cell stack devices 68, for example.

Moreover, in the examples illustrated in FIGS. 8 and 17, the module includes two cell stack devices 68. However, the module may include three or more cell stack devices 68, and the exhaust gas discharge path 89 may be formed between each cell stack device.

Furthermore, in the examples illustrated in FIGS. 8 and 17, the module include a W-shaped reformer. However, it is needless to say that the configuration of the reformer is not limited, and a U-shaped reformer may also be used, for example.

REFERENCE NUMBER 1, 68 Cell stack device
2, 63 Fuel cell
3, 65 Cell stack
4, 64 Manifold
27, 48, 61 Fuel cell module
28, 62 Housing 39, 40, 83, 84, 89 Exhaust gas discharge path
42, 49 Exhaust gas storage chamber
43 Oxygen-containing gas leading-in chamber
46 Exhaust outlet
47, 50 Exhaust hole
52 Fuel cell device
5, 66 Reformer
6, 66a Vaporizing unit
7, 66b Reforming unit
8, 67 Reformed gas leading-out pipe
35, 72 Oxygen-containing gas supply member
73 Water supply pipe
9, 75 Raw fuel gas supply pipe
75a Protruding portion
75a1 Through hole

What is claimed is:

1. A fuel cell module comprising:
a housing;
a plurality of cell stack devices inside the housing, each cell stack device including a plurality of fuel cells that generate power using fuel gas and oxygen-containing gas;
exhaust gas discharge members between the cell stack devices for discharging exhaust gas from the fuel cells; and
a reformer disposed in the housing above the plurality of fuel cells,
wherein the exhaust gas discharge members comprise at least one gas flow passage in which the gas flows in a direction from the reformer to the plurality of cell stack devices.

2. The fuel cell module according to claim 1, further comprising the exhaust gas discharge members formed between the housing and the cell stack devices positioned on both ends of the plurality of cell stack devices, and in a direction in which the plurality of cell stack devices are arranged.

3. The fuel cell module according to claim 1, wherein the exhaust gas discharge members are formed on both sides of the each cell stack device of the plurality of cell stack devices.

4. The fuel cell module according to claim 1, wherein at least one of the exhaust gas discharge members each include a first exhaust gas discharge member having an inlet positioned at a height equal to or above a bottom surface of the reformer and a second exhaust gas discharge member having an inlet positioned below the bottom surface of the reformer.

5. The fuel cell module according to claim 4, wherein the first exhaust gas discharge member is formed on one side of at least a portion of the plurality of cell stack devices in the direction in which the cell stack devices are arranged, and wherein the second exhaust gas discharge member is formed on another side of the plurality of cell stack devices in the direction in which the cell stack devices are arranged.

6. The fuel cell module according to claim 1, wherein the reformer includes an exhaust gas discharge path that leads out exhaust gas from the fuel cells to above the reformer, and wherein the exhaust gas discharge members for discharging exhaust gas from above the reformer are formed alternately with the cell stack devices.

7. The fuel cell module according to claim 1,
wherein the reformer includes a vaporizing unit that vaporizes water, and a reforming unit that uses steam from the vaporizing unit to reform raw fuel gas,
wherein the vaporizing unit includes a vaporizing unit forward path to which a water supply pipe is connected, and a vaporizing unit return path through which the steam flows,
wherein the reforming unit includes a reforming unit forward path in which the raw fuel gas is reformed, and a reforming unit return path to which a reformed gas leading-out pipe that leads out reformed gas is connected,
wherein the vaporizing unit forward path and the vaporizing unit return path are connected by a vaporizing unit connecting path,
wherein the vaporizing unit return path and the reforming unit forward path are connected by a vaporizing unit and reforming unit connecting path, and
wherein the reforming unit forward path and the reforming unit return path are connected by a reforming unit connecting path.

8. The fuel cell module according to claim 2,
wherein the plurality of cell stack devices comprises four or more cell stack devices that are arranged within the housing, and
wherein a cross-sectional area of a discharge path of the exhaust gas discharge member formed in a center portion in a direction in which the cell stack devices are arranged is greater than a cross-sectional area of a discharge path of the exhaust gas discharge member positioned on the both ends of the plurality of cell stack devices in the direction in which the plurality of the cell stack devices are arranged.

9. The fuel cell module according to claim 1, further comprising: an exhaust gas storage chamber arranged below the cell stack devices within the housing, the exhaust gas storage chamber being connected with exhaust outlets formed at one end of the exhaust gas discharge members and including an exhaust hole for discharging the exhaust gas outside of the fuel cell module, at least a portion of the exhaust gas flow path from the exhaust outlets to the exhaust hole having a meandering shape.

10. The fuel cell module according to claim 1, further comprising:
a reformer arranged inside the housing above the plurality of fuel cells;
at least two manifolds providing a reformed gas to the plurality of fuel cells; and
a reformed gas lead-out pipe connecting the reformer with the at least two of manifolds.

11. The fuel cell module according to claim 10, further comprising:
a distributor distributing the reformed gas to the at least two manifolds;
wherein the reformed gas lead-out pipe includes:
a first reformed gas lead-out pipe connecting the reformer and the distributor; and
a second reformed gas lead-out pipe connecting the distributor and the at least two of manifolds.

12. A fuel cell device, comprising:
a fuel cell module comprising
a housing,
a plurality of cell stack devices inside the housing, each cell stack device including a plurality of fuel cells that generate power using fuel gas and oxygen-containing gas,
exhaust gas discharge members between the cell stack devices for discharging exhaust gas from the fuel cells, and a reformer disposed in the housing above the plurality of fuel cells, wherein the exhaust gas discharge members comprise at least one gas flow passage in which the gas flows in a direction from the reformer to the plurality of cell stack devices;

an auxiliary device for operating the fuel cell module; and an outer casing that houses the fuel cell module and the auxiliary device.

13. The fuel cell device according to claim 12, wherein at least one of the exhaust gas discharge members each include a first exhaust gas discharge member having an inlet positioned at a height equal to or above a bottom surface of the reformer and a second exhaust gas discharge member having an inlet positioned below the bottom surface of the reformer.

14. The fuel cell device according to claim 13, wherein the first exhaust gas discharge member is formed on one side of at least a portion of the plurality of cell stack devices in the direction in which the cell stack devices are arranged, and wherein the second exhaust gas discharge member is formed on another side of the plurality of cell stack devices in the direction in which the cell stack devices are arranged.

15. The fuel cell device according to claim 12, wherein the reformer includes a vaporizing unit that vaporizes water, and a reforming unit that uses steam from the vaporizing unit to reform raw fuel gas, wherein the vaporizing unit includes a vaporizing unit forward path to which a water supply pipe is connected, and a vaporizing unit return path through which the steam flows, wherein the reforming unit includes a reforming unit forward path in which the raw fuel gas is reformed, and a reforming unit return path to which a reformed gas leading-out pipe that leads out reformed gas is connected, wherein the vaporizing unit forward path and the vaporizing unit return path are connected by a vaporizing unit connecting path, wherein the vaporizing unit return path and the reforming unit forward path are connected by a vaporizing unit and reforming unit connecting path, and wherein the reforming unit forward path and the reforming unit return path are connected by a reforming unit connecting path, cell stack devices are arranged.

16. The fuel cell device according to claim 12, further comprising: an exhaust gas storage chamber arranged below the cell stack devices within the housing, the exhaust gas storage chamber being connected with exhaust outlets formed at one end of the exhaust gas discharge members and including an exhaust hole for discharging the exhaust gas outside of the fuel cell module, at least a portion of the exhaust gas flow path from the exhaust outlets to the exhaust hole having a meandering shape.

17. The fuel cell device according to claim 12, further comprising:

at least two manifolds providing a reformed gas to the plurality of fuel cells; and a reformed gas lead-out pipe connecting the reformer with the at least two of manifolds.

18. The fuel cell device according to claim 17, further comprising:

a distributor distributing the reformed gas to the at least two manifolds;

wherein the reformed gas lead-out pipe includes:

a first reformed gas lead-out pipe connecting the reformer and the distributor; and a second reformed gas lead-out pipe connecting the distributor and the at least two of manifolds.

* * * * *